(12) United States Patent
Liang et al.

(10) Patent No.: US 9,302,722 B2
(45) Date of Patent: Apr. 5, 2016

(54) SEAL ASSEMBLY FOR TRACK PIN JOINT ASSEMBLY OF UNDERCARRIAGE

(71) Applicant: Caterpillar Inc., Peoria, IL (US)

(72) Inventors: Guanghui Liang, Dunlap, IL (US); Mark Diekevers, Germantown Hills, IL (US); Mark Kiesel, Peoria, IL (US); Darren Antoine, East Peoria, IL (US); Temitope Akinlua, Peoria, IL (US); Travis King, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 64 days.

(21) Appl. No.: 14/448,494

(22) Filed: Jul. 31, 2014

(65) Prior Publication Data

US 2015/0061368 A1 Mar. 5, 2015

Related U.S. Application Data

(60) Provisional application No. 61/872,469, filed on Aug. 30, 2013.

(51) Int. Cl.
*B62D 55/088* (2006.01)
*F16J 15/32* (2006.01)
*B62D 55/21* (2006.01)

(52) U.S. Cl.
CPC .......... *B62D 55/0887* (2013.01); *B62D 55/21* (2013.01); *F16J 15/3208* (2013.01)

(58) Field of Classification Search
CPC .. B62D 55/088; B62D 55/0887; B62D 55/18; B62D 55/20; B62D 55/205; B62D 55/21; F16J 15/32; F16J 15/3204; F16J 15/3208

USPC ......... 305/100, 102, 103, 104, 105, 106, 202, 305/203; 277/381, 384, 573, 549, 372, 373, 277/380, 402, 445, 446
See application file for complete search history.

(56) References Cited

U.S. PATENT DOCUMENTS

| | | | |
|---|---|---|---|
| 4,262,914 A | 4/1981 | Roley | |
| 5,390,997 A | 2/1995 | Nakaishi et al. | |
| 6,102,408 A * | 8/2000 | Anderton | B62D 55/0887 277/370 |
| 6,478,388 B2 | 11/2002 | Maguire | |
| 8,360,534 B2 * | 1/2013 | Vom Stein | B62D 55/0887 305/103 |
| 8,485,926 B2 * | 7/2013 | Vom Stein | B62D 55/15 277/381 |

(Continued)

FOREIGN PATENT DOCUMENTS

| | | |
|---|---|---|
| EP | 2514657 | 10/2012 |
| GB | 1104896 A | 3/1968 |
| WO | 2006002845 | 1/2006 |

*Primary Examiner* — John Walters

(57) ABSTRACT

A seal assembly can be incorporated into a track pin joint assembly including a pin defining a longitudinal axis, a first member and a second member both coaxial with the pin about the longitudinal axis. The first member is pivotable about the longitudinal axis with respect to the second member and includes a load ring engagement surface defining, at least in part, an axially-extending seal cavity disposed in proximal relationship to the second member. A seal assembly including a seal ring and a load ring is disposed in the seal cavity and sealingly engages the first member and the second member. The load ring includes a main body and a neck having a neck perimeter with a first sealing blade disposed along the neck perimeter and comprising an outwardly-extending projection. The first sealing blade is adapted to sealingly engage one of the seal ring and the first member.

20 Claims, 13 Drawing Sheets

(56) References Cited

U.S. PATENT DOCUMENTS

| | | | |
|---|---|---|---|
| 2004/0026870 A1* | 2/2004 | Maguire | F16J 15/344 277/377 |
| 2010/0148572 A1 | 6/2010 | Vom Stein | |
| 2011/0243648 A1 | 10/2011 | Johannsen et al. | |
| 2012/0161510 A1 | 6/2012 | Diekevers et al. | |
| 2012/0267859 A1* | 10/2012 | Liang | B62D 55/211 277/358 |

* cited by examiner

SEAL ASSEMBLY FOR TRACK PIN JOINT ASSEMBLY OF UNDERCARRIAGE

CROSS-REFERENCE TO RELATED APPLICATION

This patent application claims the benefit of priority to U.S. Patent Application No. 61/872,469, filed Aug. 30, 2013, and entitled "Seal Assembly for Track Pin Joint Assembly of Undercarriage," which application is incorporated in its entirety herein by this reference.

TECHNICAL FIELD

This patent disclosure relates generally to an undercarriage for a track-type machine and, more particularly, to a seal assembly for use in a track pin joint assembly of the undercarriage.

BACKGROUND

Track-type machines are in widespread use in construction, mining, forestry, and other similar industries. The undercarriage of such track-type machines utilizes track assemblies, rather than wheels, to provide ground-engaging propulsion. Such track assemblies may be preferred in environments where creating sufficient traction is problematic, such as those frequently found in the industries identified above. Specifically, rather than rolling across a work surface on wheels, track-type machines utilize one or more track assemblies that include an endless loop of coupled track links defining outer surfaces, which support ground-engaging track shoes, and inner surfaces that travel about one or more rotatable track-engaging elements, such as, drive sprockets, idlers, tensioners, and rollers, for example.

Typical track chain assembly designs include a track pin either fixedly or rotatably connected to a pair of chain links and a bushing rotatably positioned between the links and about the track pin. Such track chain assemblies can operate in extremely adverse environments in which track joints may be exposed to various abrasive mixtures of water, dirt, sand, rock or other mineral or chemical elements.

Track seals are disposed between the components of a track chain of a tracked undercarriage in order to seal the track chain against dirt, mud, and debris while retaining lubricants in the track chain. The failure of a seal within a track chain can accelerate wear and cause early failure of a portion of the track chain.

A common type of seal used in track chains is referred to as a "can" seal. A can seal often includes a "lip" supported by a can and a load ring engaging the can. The surface defining a seal cavity interacts with the load ring to apply a force to the can and lip combination. The lip engages a sealing surface of an adjacent component. The can seal, the surface of one component defining the seal cavity, and the sealing surface of the adjacent component cooperate together to provide a sealed interface to retain lubricant within the assembly and protect against dirt, mud, abrasive materials, debris and other contaminants. Examples of such can seals are shown and described in U.S. Patent Application Publication No. US 2007/10267821; U.S. Pat. Nos. 6,739,680; 5,794,940; and 4,094,516; and International Application Publication No. WO 2008/093160 A1.

One cause of failure of current can-type seals is known in the art as "heel under." Heel under describes the situation where debris is ingested between an outer surface of the load ring and the seal cavity. The debris builds up and can cause the load ring to rotate or move out of position against the can resulting in the failure of the can seal and leakage of lubricant.

U.S. Patent Application Publication No. US 2011/0254364 is entitled, "Seal Assembly for Track Pin Joint Assembly," and is directed to a seal assembly which can be incorporated into a track pin joint assembly including a pin defining a longitudinal axis, a first member and a second member both coaxial with the pin about the longitudinal axis. A seal assembly including a seal ring and a load ring is disposed in a seal cavity and sealingly engages the first member and the second member. At least one of a load ring engagement surface of the first member and an axial segment of a first member engagement surface of the load ring includes a convex rounded portion extending over at least half the axial length thereof. The load ring may include a neck portion extending from the main body at a first angle to an axial segment of a can engagement surface in an uninstalled state with the neck extending from the main body at a second angle to the axial segment of the can engagement surface in an installed state. Although such a seal assembly is effective to help reduce the incidence of heel under failures, there is a continued need in the art to provide additional solutions for a seal assembly which can maintain adequate seal pressure and help resist seal failures, such as, heel under.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a load ring for use in a seal assembly configured to seal a joint having a first member pivotable about a rotational axis relative to a second member thereof. The seal assembly can be a "can"-type seal assembly including a seal ring having an axial flange extending along the rotational axis and a radial flange extending along a radial axis perpendicular to the rotational axis. The first member includes a load ring engagement surface defining, at least in part, an axially-extending seal cavity about the rotational axis.

The load ring includes a main body and a neck. The main body is annular and includes a seal ring engagement surface and a first member engagement surface. The seal ring engagement surface includes an axial segment and a radial segment adapted to engage the axial flange and the radial flange of the seal ring, respectively. The first member engagement surface is adapted to engage the load ring engagement surface of the first member. The first member engagement surface includes an axial segment and a radial segment. The radial segment of the first member engagement surface is in distal relationship with the radial segment of the seal ring engagement surface. The neck extends from the main body and is disposed between the axial segment of the first member engagement surface and the radial segment of the seal ring engagement surface. The neck has a neck perimeter with a first sealing blade which is disposed along the neck perimeter and which comprises an outwardly-extending projection. The first sealing blade is adapted to sealingly engage one of the seal ring and the first member.

In another embodiment, a seal assembly is provided that is adapted for use in sealing a joint having a first member pivotable about a rotational axis relative to a second member thereof. The first member includes a load ring engagement surface defining, at least in part, an axially-extending seal cavity about the rotational axis.

The seal assembly includes a seal ring and a load ring. The seal ring has an axial flange extending along the rotational axis and a radial flange extending along a radial axis perpendicular to the rotational axis.

The load ring includes a main body and a neck. The main body is annular and includes a seal ring engagement surface and a first member engagement surface. The seal ring engagement surface includes an axial segment and a radial segment in engaging relationship with the axial flange and the radial flange of the seal ring, respectively. The first member engagement surface is adapted to engage the load ring engagement surface of the first member. The first member engagement surface includes an axial segment and a radial segment. The radial segment of the first member engagement surface is in distal relationship with the radial segment of the seal ring engagement surface. The neck extends from the main body and is disposed between the axial segment of the first member engagement surface and the radial segment of the seal ring engagement surface. The neck has a neck perimeter with a first sealing blade which is disposed along the neck perimeter and which comprises an outwardly-extending projection. The first sealing blade is adapted to sealingly engage one of the seal ring and the first member.

In still another embodiment, a track pin joint assembly is disclosed that includes a pin, a first member, a second member, and a seal assembly. The pin defines a longitudinal axis. The first member and the second member are both coaxial with the pin about the longitudinal axis. The first member is pivotable about the longitudinal axis with respect to the second member. The first member includes an end and a load ring engagement surface defining, at least in part, a seal cavity disposed in proximal relationship to the second member.

The seal assembly is disposed in the seal cavity and sealingly engages the first member and the second member. The seal assembly includes a seal ring, a sealing lip, and a load ring.

The seal ring has an axial flange extending along the longitudinal axis and a radial flange extending along a radial axis perpendicular to the longitudinal axis. The sealing lip extends axially from the radial flange of the seal ring and is in engaging relationship with the second member to provide a running seal therebetween.

The load ring includes a main body and a neck. The main body is annular and includes a seal ring engagement surface and a first member engagement surface. The seal ring engagement surface includes an axial segment and a radial segment in engaging relationship with the axial flange and the radial flange of the seal ring, respectively. The first member engagement surface is in engaging relationship with the load ring engagement surface of the first member. The first member engagement surface includes an axial segment and a radial segment. The radial segment of the first member engagement surface is in distal relationship with the radial segment of the seal ring engagement surface. The neck extends from the main body and is disposed between the axial segment of the first member engagement surface and the radial segment of the seal ring engagement surface. The neck has a neck perimeter with a first sealing blade which is disposed along the neck perimeter and which comprises an outwardly-extending projection. The first sealing blade is adapted to sealingly engage one of the seal ring and the first member.

Further and alternative aspects and features of the disclosed principles will be appreciated from the following detailed description and the accompanying drawings. As will be appreciated, the principles related to track seal assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

The present disclosure provides a seal assembly for a track chain pin joint assembly of an undercarriage of a track-type machine. In some embodiments, the pin joint assembly can comprise a track pin cartridge assembly. Examples of track-type machines include machines used for construction, mining, forestry, and other similar industries. In some embodiments, the machine can be a dozer, loader, excavator, or any other on-highway or off-highway vehicle having a track-type undercarriage. The undercarriage can include track assemblies adapted to engage the ground, or other surface, to propel the track-type machine.

Figure 1:
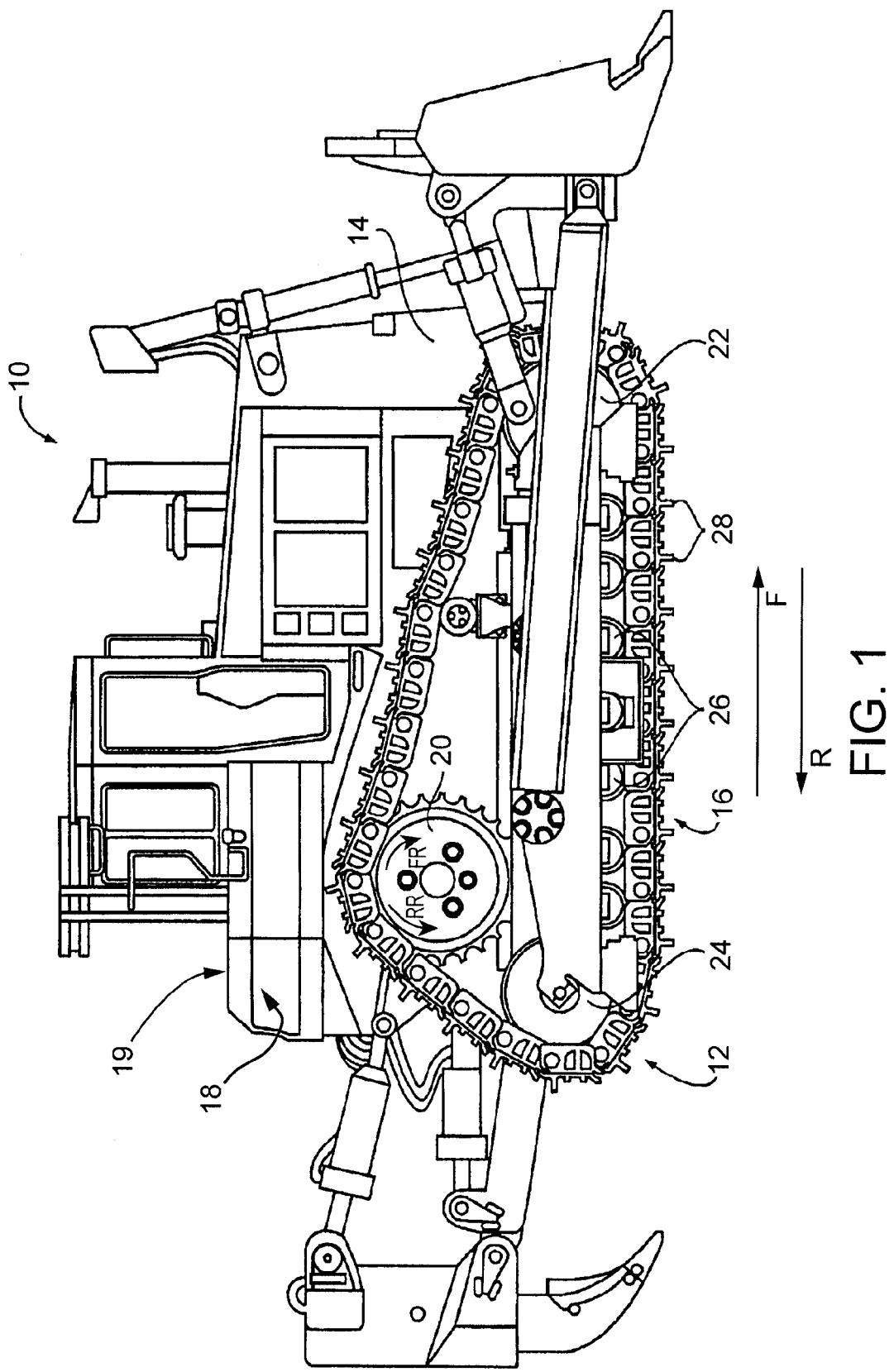
FIG. 1 is a diagrammatic side elevational view of an embodiment of a track-type machine which includes an undercarriage constructed in accordance with principles of the present disclosure.

Turning now to the Figures, there is shown in FIG. 1 an exemplary embodiment of a machine 10 with a track-type undercarriage 12. The machine 10 may also be referenced herein as a track-type machine. In other embodiments, the machine 10 may be any suitable machine with a track-type undercarriage, such as, a dozer, loader, excavator, or any other on-highway or off-highway vehicle.

The machine 10 includes a frame 14 having a first track chain assembly 16 disposed on a first side 18 thereof, and a second track chain assembly (not shown) disposed on a second side 19 thereof. The second side 19 is in opposing relationship to the first side 18. Together, the track assemblies are adapted to engage the ground, or other surface, to propel the machine 10.

It should be appreciated that the track assemblies of the machine 10 may be similar and, further, may represent mirror images of one another. As such, only the first track chain assembly 16 will be described herein. It should be understood that the description of the first track chain assembly 16 is applicable to the second track chain assembly, as well.

The first track chain assembly 16 extends about a plurality of rolling elements such as a drive sprocket 20, a front idler 22, a rear idler 24, and a plurality of track rollers 26. The track chain assembly 16 includes a plurality of ground-engaging track shoes 28 for engaging the ground, or other surface, and propelling the machine 10.

During typical operation of the undercarriage 12, the drive sprocket 20 is driven in a forward rotational direction "FR" to drive the track chain assembly 16, and thus the machine 10, in a forward direction "F," and in a reverse rotational direction "RR" to drive the track chain assembly 16, and thus the machine 10, in a reverse direction "R." The drive sprockets 20 of the undercarriage 12 can be independently operated to turn the machine 10.

While the machine 10 is illustrated in the context of a track-type machine, it should be appreciated that the present disclosure is not thereby limited, and that a wide variety of other machines having tracks are also contemplated within the present context. For example, in other embodiments, the track chain assembly 16 can be included in a conveyor system, as a track for transmitting torque between rotating elements, or in any other application known to those skilled in the art.

Figure 2:
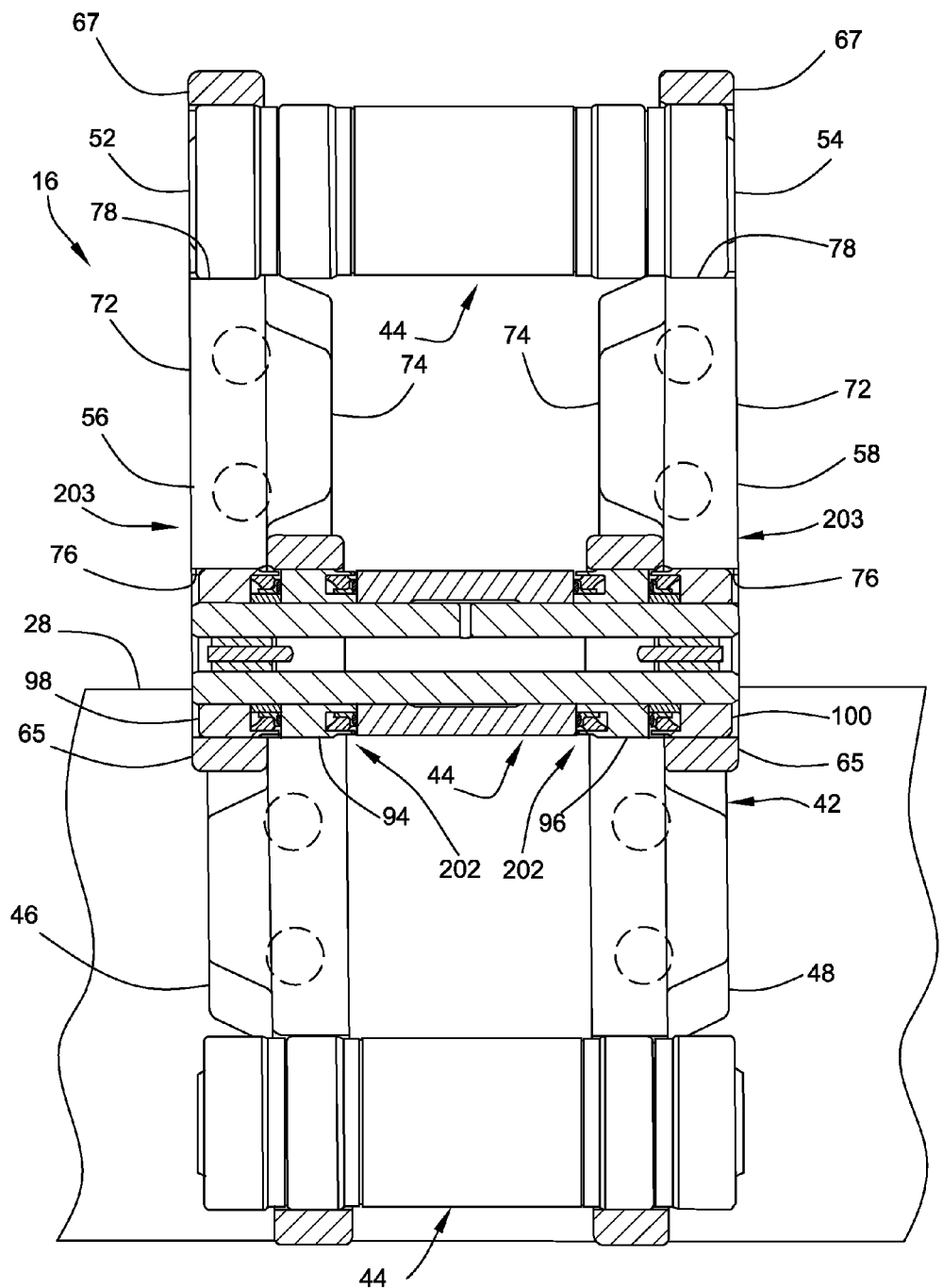
FIG. 2 is a top plan view of a portion of an embodiment of a track chain assembly constructed in accordance with principles of the present disclosure.

Referring now to FIG. 2, the first track chain assembly 16, only a portion of which is shown, includes a plurality of subassemblies 42. Each subassembly 42 includes a track pin cartridge assembly 44, an inner link 46, an outer link 48, and a track shoe 28 connected to the inner and outer links 46, 48. A number of subassemblies 42 are mechanically coupled to adjacent subassemblies 42 so that, when an appropriate number of these subassemblies 42 are connected together, the track chain assembly 16 is formed. The first track chain assembly 16 has a predetermined length for a given application with opposite ends that are capable of being connected together to form a closed loop. The closed loop is formed by mechanically coupling the opposite ends together with an inner master link 52 and outer master link 54 to respectively provide an inner chain 56 of a series of inner links 46 and an outer chain 58 of a series of outer links 48 coupled together via a plurality of track pin cartridge assemblies 44.

It should be recognized that the terms "inner" and "outer," in reference to the links 46, 48 of each subassembly 42 and the master links 52, 54, in this example are used merely as descriptors for the orientation shown in the Figures. Other terms, such as, "left" and "right" or "first" and "second," could be interchangeably used as well. It should be understood that these terms are merely convenient labels applied to the different views and are not meant to be limiting in any way.

Figure 3:
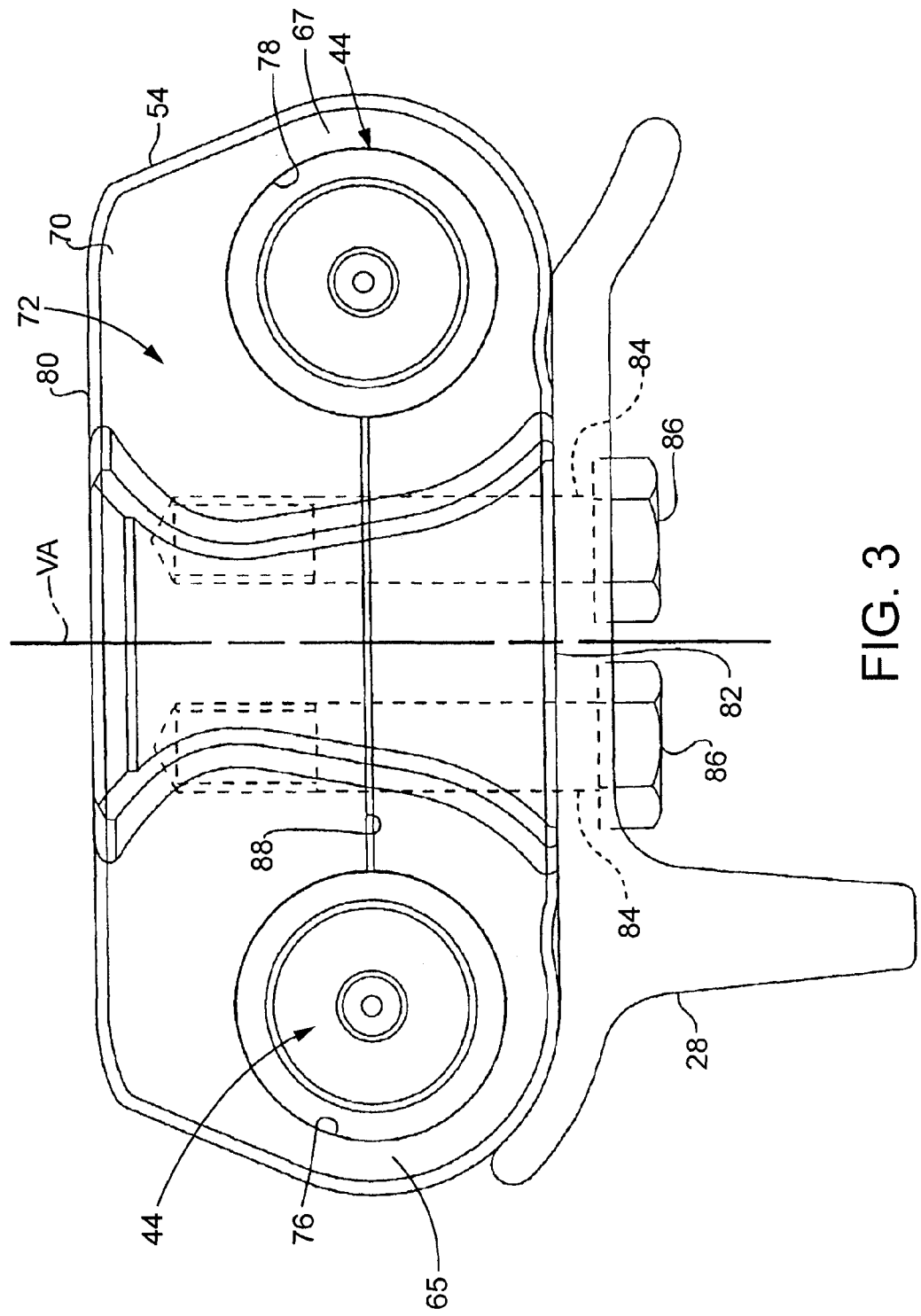
FIG. 3 is a side elevational view of a subassembly of the track chain assembly of FIG. 2.

Referring now to FIGS. 2 and 3, the inner and outer links 46, 48 and the inner and outer master links 52, 54 in this embodiment are shown as being straight links each having a first end portion 65 and a second end portion 67. The inner master link 52 is identical to the outer master link 54. Therefore, only the outer master link 54 will be described in detail. It should be understood that the description of the outer master link 54 is applicable to the inner master link 52.

The outer master link 54 includes a body portion 70 with a first side 72 and a second side 74 in opposing relationship to the first side 72. A first aperture 76 extends through the first end portion 65. A second aperture 78 extends through the second end portion 67. The body portion 70 also includes a rail surface 80 and a shoe surface 82. An aperture 84 is positioned on both sides of, and a predetermined distance from, a central vertical axis "VA." Each aperture 84 is laterally centered with respect to the widest portion of body portion 70. A fastener 86 is positioned in each aperture 84 to secure the track shoe 28 to the shoe surface 82 of the outer master link 54. Any number of different varieties of track shoes can be used in other embodiments.

The body portion 70 of the outer master link 54 includes a relief channel 88 extending substantially perpendicularly relative to the central vertical axis "VA" between the first aperture 76 and the second aperture 78. The relief channel 88 extends through the body portion 70 from the first side 72 to the second side 74 thereof. As the fasteners 86 are tightened to secure the track shoe 28 to the outer master link 54, the portions of the body portion 70 defining the height of the relief channel 88, measured along the vertical axis "VA" are drawn together, effectively reducing the diameter of the first and second apertures 76, 78. Thus, the master link 54 retentively engages the track pin cartridge assemblies 44 respectively disposed in the first aperture 76 and the second aperture 78 upon sufficiently reducing the diameters of the first and second apertures 76, 78 through the use of the fasteners 86. In some embodiments, the inner and outer links 46, 48 can have a construction that is similar to that of the outer master link 54.

Figure 4:
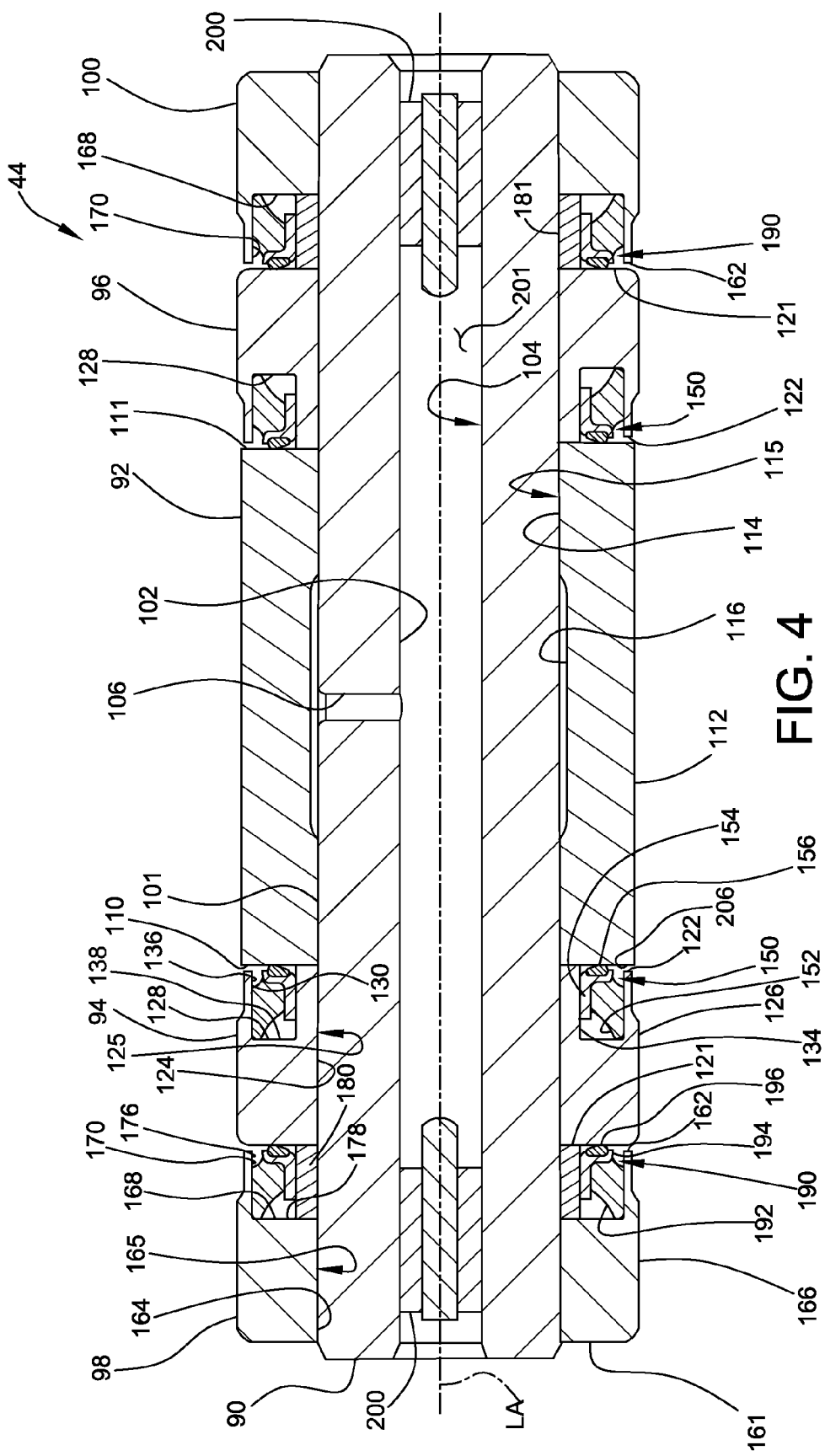
FIG. 4 is a longitudinal cross-sectional view of a pin cartridge assembly of the track chain assembly of FIG. 2.

Referring to FIG. 4, the track pin cartridge assembly 44 is illustrated according to one of several possible embodiments of the present disclosure. The illustrated track pin cartridge assembly 44 includes a track pin 90, a bushing 92, first and second bearing members 94, 96, and first and second collars 98, 100.

The track pin 90 defines a longitudinal axis "LA." The track pin 90 includes an outer surface 101 and an inner surface 102 defining a cylindrical bore 104 extending therethrough along the longitudinal axis "LA" and concentrically disposed about the longitudinal axis "LA." The track pin 90 defines a cross bore 106 that extends from the outer surface 101 thereof inwardly to the bore 104 in a direction perpendicular to the central longitudinal axis "LA."

The bushing 92 has a pair of opposing first and second end faces 110, 111, an outer surface 112, an inner surface 114 defining a passage in the form of a cylindrical bore 115 therethrough that is concentrically disposed about the longitudinal axis "LA," and a stepped passage 116 concentrically positioned with respect to the outer surface 112. The bushing 92 is disposed concentrically about the track pin 90 with the track pin 90 extending through the bore 115 of the bushing 92. The bushing 92 is rotatably positioned about the track pin 90 such that the bushing 92 is rotatable relative the track pin 90 about the longitudinal axis "LA." The first and second end faces 110, 111 of the bushing 92 are disposed adjacent to the first and second bearing members 94, 96, respectively. The outer surface 112 of the bushing 92 is substantially cylindrical. The stepped passage 116 is substantially aligned with the cross bore 106 of the track pin 90.

In other embodiments, the outer surface 112 of the bushing 92 can define a lobed surface, such as is shown and described in U.S. Patent Application Publication No. 2010/0139993 for a "Lobed Bushing For Track Assembly and Track-Type Machine Using Same," which is incorporated in its entirety herein by this reference. In yet other embodiments, the bushing 92 can have a different shape and configuration as known in the art.

It should be appreciated that the first bearing member 94 and the first collar 98 are substantially identical to the second bearing member 96 and the second collar 100, respectively. Therefore, only the first bearing member 94 and the first collar 98 will be described in detail herein. It should be understood that the description of the first bearing member 94 is applicable to the second bearing member 96, and the description of the first collar 98 is applicable to the second collar 100.

The first bearing member 94 includes a first end portion 121, a second end portion 122, an inner surface 124 defining a cylindrical bore 125 therethrough that is concentrically disposed about the longitudinal axis "LA," and an outer surface 126. The bore 125 of the first bearing member 94 can be configured such that the first bearing member 94 can rotate with respect to the track pin 90 about the longitudinal axis "LA."

The first end portion 121 extends radially between the inner surface 124 and the outer surface 126 and forms an abutting surface. The first bearing member 94 is positioned about the track pin 90 so that the first end portion 121 thereof is adjacent the first collar 98 and the second end portion 122 thereof is adjacent the first end face 110 of the bushing 92.

The components of the track pin cartridge assembly 44 can define a plurality of annular seal grooves or cavities that are concentrically disposed about the longitudinal axis "LA" of the track pin 90. Each seal cavity can be adapted to house therein a seal assembly constructed according to principles of the present disclosure and suitable for sealingly engaging relatively rotatable components of the track pin cartridge assembly 44.

For example, the second end portion 122 of the first bearing member 94 defines an axially-extending seal cavity 128 in the form of an annular channel or groove. The first bearing member 94 includes a load ring engagement surface 130 defining, at least in part, the axially-extending seal cavity 128. The seal cavity 128 is positioned in the second end portion 122 such that seal cavity 128 is concentric with the central longitudinal axis "LA" of the track pin 90.

The illustrated second end portion 122 includes an inner cylindrical axial wall segment 134, an outer cylindrical axial wall segment 136, and a radial base segment 138 extending between the inner and outer cylindrical axial wall segments 134, 136. The inner and outer cylindrical axial wall segments 134, 136 and the radial base segment 138 define the seal cavity 128. The inner and outer cylindrical axial wall segments 134, 136 are concentrically disposed about the longitudinal axis "LA."

In embodiments, the load ring engagement surface 130 can include at least part of the outer cylindrical axial wall segment 136 and/or the radial base segment 138. In the illustrated embodiment, the load ring engagement surface 130 includes at least part of both the outer cylindrical axial wall segment 136 and the radial base segment 138

In embodiments, the outer cylindrical axial wall segment 136 is tapered outwardly with respect to the central longitudinal axis "LA" at a predetermined angle. In one embodiment, the predetermined angle is about 5°. In a similar manner, the inner cylindrical axial wall segment 134 can be tapered inwardly with respect to central longitudinal axis "LA." The inner cylindrical axial wall segment 134 can extend axially beyond the outer cylindrical axial wall segment 136 toward the first end face 110 of the bushing 92.

The orientation of the outer cylindrical axial wall segment 136 such that it is angled away from the central longitudinal axis "LA" can facilitate the insertion of a seal assembly into the seal cavity 128. In particular, the predetermined angle of the outer cylindrical axial wall segment 136 can enhance the installation capability of the equipment utilized to insert the seal assembly into the seal cavity 128.

For purposes of illustration, the first bearing member 94 can be considered a "first member," and the bushing 92 can be considered a "second member." The first member in the form of the first bearing member 94 and the second member in the form of the bushing 92 are both coaxial with the track pin 90 about the longitudinal axis "LA." The first member in the form of the first bearing member 94 is pivotable with respect to the second member in the form of the bushing 92 about a rotational axis that coincides with the longitudinal axis "LA" of the track pin 90.

A first seal assembly 150 constructed in accordance with principles of the present disclosure can be disposed within the seal cavity 128 defined in part by the load ring engagement surface 130 adjacent the second end portion 122 of the first member in the form of the first bearing member 94. The axially-extending seal cavity 128 is disposed in proximal relationship to the second member in the form of the bushing 92 in this example. The seal assembly 150 sealingly engages the first member in the form of the first bearing member 94 and the second member in the form of the bushing 92 while allowing relative rotation therebetween.

The first seal assembly 150 includes a load ring 152, a can or seal ring 154, and a seal member in the form of a sealing lip 156. The load ring 152 can be made from any suitable material which can provide sealing and spring-like characteristics, such as an elastomeric material, for example. The sealing lip 156 can be made from any suitable sealing material, such as, a plastic including a urethane compound, for example. The seal ring 154 can be made from any suitable material, such as metal or glass-reinforced polycarbonate, for example. The components of the seal assembly 150 can be made from other materials in other embodiments without altering the functional aspects of the design.

The load ring 152 and the sealing lip 156 are positioned in the seal cavity 128 so that the load ring 152 acts upon the seal ring 154 to urge the sealing lip 156 in an axial direction along the longitudinal axis "LA" from the seal cavity 128 into sealing engagement with the first end face 110 of the bushing 92, which can be considered a second member in this instance. The sealing lip 156 can rotate with respect to the sealing surface of the first end face 110 of the bushing 92 against which it is sealingly engaged to provide a running seal therebetween. The load ring 152 sealingly engages the load ring engagement surface 130 of the first bearing member 94, which can be considered a first member in this instance.

The first collar 98 includes a first end portion 161, a second end portion 162, an inner surface 164 defining a cylindrical bore 165 that is concentrically disposed about the longitudinal axis "LA," and an outer surface 166. The first collar 98 is positioned at one end of the track pin 90 and is press fit with the track pin 90 such that the first collar 98 and the track pin 90 are rotatively coupled together.

The first end portion 161 of the first collar 98 extends radially between the inner surface 164 and the outer surface 166 and forms an outer radial surface of the track pin cartridge assembly 44. The second end portion 162 defines an axially-extending seal cavity 168 in the form of an annular channel or groove. The first collar 98 includes a load ring engagement surface 170 defining, at least in part, the axially-extending seal cavity 168. The seal cavity 168 is positioned in the second end portion 162 such that seal cavity 168 is concentric with the longitudinal axis "LA."

The second end portion 162 includes an outer cylindrical axial wall segment 176 and a radial base segment 178 extending between the outer cylindrical axial wall segment 176 and the inner surface 164. A first thrust ring 180 is disposed between the first collar 98 and the first bearing member 94 and is adapted to transmit axial loads therebetween. The outer cylindrical axial wall segment 176, the radial base segment 178, and the first thrust ring 180 define the seal cavity 168. A second thrust ring 181 is similarly disposed between the second collar 100 and the second bearing member 96 and is adapted to transmit axial loads therebetween.

The seal cavity 168 of the first collar 98 can be substantially similar in configuration to the seal cavity 128 of the first bearing member 94. For example, the outer cylindrical axial wall segment 176 can be tapered outwardly with respect to the central longitudinal axis "LA" at a predetermined angle similar to the outer cylindrical axial wall segment 136 of the first bearing member 94. In one embodiment, the predetermined angle is about 5°.

The load ring engagement surface 170 can include at least part of the outer cylindrical axial wall segment 176 and/or the radial base segment 178. In the illustrated embodiment, the load ring engagement surface 170 includes at least part of both the outer cylindrical axial wall segment 176 and the radial base segment 178.

A second seal assembly 190 is disposed in the seal cavity 168 defined in part by the load ring engagement surface 130 adjacent the second end portion 162 of the first collar 98. The seal assembly 190 sealingly engages a first member in the form of the first collar 98 and a second member in the form of the first bearing member 94 while allowing relative rotation therebetween.

The second seal assembly 190 includes a load ring 192, a seal ring 194, and a seal member in the form of a sealing lip 196. The components of the second seal assembly 190 are similar in composition and function to that of the first seal assembly 150 as described above in connection with the seal cavity 128 of the first bearing member 94.

The load ring 192 and the sealing lip 196 of the second seal assembly 190 are positioned in seal cavity 168 so that the load ring 192 acts upon the seal ring 194 to urge the sealing lip 196 in an axial direction along the longitudinal axis "LA" from the seal cavity 168 into sealing engagement with the first end portion 121 of the first bearing member 94, which can be considered a second member in this instance. The sealing lip 196 can rotate with respect to the sealing surface of the first end portion 121 of the first bearing member 94 against which it is sealingly engaged to provide a running seal therebetween. The load ring 192 sealingly engages the load ring engagement surface 170 of the first collar 98, which can be considered a first member in this instance.

The track pin cartridge assembly 44 is arranged with the bushing 92 disposed between the first and second bearing members 94, 96, which, in turn, are respectively disposed between the first collar 98 and the bushing 92 and the second collar 100 and the bushing 92. The first bearing member 94 is positioned about the track pin 90 so that the second end portion 122 of the first bearing member 94, which defines the seal cavity 128, is adjacent the first end face 110 of the bushing 92. The second bearing member 96 is positioned about the track pin 90 so that the second end portion 122 of the second bearing member 96, which also defines the seal cavity 128, is adjacent the second end face 111 of the bushing 92. The first and second collars 98, 100 are positioned about the track pin 90 so that the second end portion 162 of each of the first and second collars 98, 100, which defines the seal cavity 168, is respectively adjacent the first end portion 121 of the first and second bearing members 94, 96.

The illustrated second bearing member 96 is configured such that the second bearing member 96 can rotate with respect to the track pin 90 about the longitudinal axis "LA." The second collar 100 is positioned at one end of the track pin 90 and is press fit with the track pin 90 such that the second collar 100 and the track pin 90 are rotatively coupled together.

The first and second collars 98, 100 can be positioned with respect to the ends of the track pin 90 such that the seal assemblies 150, 190 of the track pin cartridge assembly 44 are compressively engaged between the respective adjacent components to sealingly contact the sealing surfaces of the adjacent members such that a running fluid-tight seal is formed therebetween. As shown, each load ring 152, 192 sealingly engages the first member and is placed in compression thereby. The compression of the load rings 152, 192 provides a sealing force to each corresponding sealing lip 156, 196, which is sealingly engaged against the sealing surface of the second member to form a running fluid-tight seal therebetween.

The use of the terms "first member" and "second member" are for illustrations purposes and are merely convenient labels applied to illustrative pairs of relatively rotatable components to describe various principles of the present disclosure. These phrases should not be viewed as limiting in any way. It should be understood by one skilled in the art that other pairs of first and second members (such as, the relative movement between the second bearing member 96 and the bushing 92 and/or the second collar 100 and the second bearing member 96) are present in the track pin cartridge assembly 44 and similarly equipped with a seal assembly 150, 190 constructed in accordance with principles of the present disclosure. Each seal assembly 150, 190 can be adapted to sealingly engage both the first and the second members between which it is respectively disposed.

The illustrated track pin cartridge assembly 44 includes four seal assemblies 150, 190. A pair of seal assembles 150 is respectively disposed between the first end face 110 of the bushing 92 and the second end portion 122 of the first bearing member 94 and between the second end face 111 of the bushing 92 and the second end portion 122 of the second bearing member 96. Another pair of seal assemblies 190 is respectively disposed between the first end portion 121 of the first and second bearing members 94, 96 and the second end portion 162 of the first and second collars 98, 100.

A pair of plugs 200 are positioned in the bore 104 of the track pin 90 forming a fluid reservoir 201 in the bore 104 thereof. The pair of plugs 200 sealably prevents a fluid, such as lubricating oil, from leaking from the bore 104. In use, fluid disposed within the fluid reservoir 201 of the track pin cartridge assembly 44 is in fluid communication with and advanced through the cross bore 106 to the outer surface 101 of track pin 90. Once disposed on the outer surface 101, the fluid facilitates the rotation of the first and second bearing members 94, 96 and the bushing 92 relative to the track pin 90. Retention of the fluid within the track pin cartridge assembly 44 is assisted by the first and second seal assemblies 150, 190 respectively disposed in the seal cavities 128, 168 of the first and second bearing members 94, 96 and the first and second collars 98, 100 while keeping debris out (e.g. sand, dirt, etc).

Referring to FIG. 2, each set of inner and outer links 46, 48 can be rotatively mounted to the track pin cartridge assembly 44. In particular, the inner and outer links 46, 48 can be respectively coupled with the first and second bearing members 94, 96 of the track pin cartridge assembly 44 to form a pair of first link assemblies 202. The inner and outer master links 52, 54 can be respectively coupled with the first and second collars 98, 100 to form a pair of second link assemblies 203.

Each first link assembly 202 and second link assembly 203 is mounted to the track pin 90 such that the first and second link assemblies 202, 203 are rotatable with respect to each other about the longitudinal axis "LA" of the track pin 90. In this way, the inner and outer links 46, 48 can rotate relative to the inner and outer master links 52, 54.

In this example, the second link assemblies 203 each include a first member in the form of the first and second collars 98, 100. The load ring engagement surfaces 170 of the first and second collars 98, 100 define, at least in part, the seal cavities 168 respectively disposed between cooperating first link assembly 202 and second link assembly 203 adjacent each end face 110, 111 of the bushing 92. A seal assembly 190 is disposed in each seal cavity 168 to sealingly engage the first link assembly 202 and the second link assembly 203 (see FIG. 4 also).

Although the track pin cartridge assembly 44 shown in FIG. 4 has a seal cavity 128 positioned in the first and second bearing members 94, 96 and a seal cavity 168 positioned in the first and second collars 98, 100, it is also contemplated that the seal cavities 128, 168 are located in other positions in other embodiments. Accordingly, in other embodiments of a track pin joint assembly, other components (such as, the bushing 92 and the track links 46, 48, 52, 54, for example) can define suitable seal cavities, and other seal cavity locations within the components of the track pin joint assembly can be used.

For example, in one embodiment, a seal cavity may be positioned in the first and second end faces 110, 111 of the bushing 92 with each of the first and second bearing members 94, 96 flipped end for end. In such an embodiment, the seal groove or the seal cavity 168 in the first and second collars 98, 100 can be omitted. In another embodiment, a seal cavity may be positioned in the first and second end faces 110, 111 of the bushing 92 and in the second end portions 162 of the first and second collars 98, 100. In such an embodiment, the seal cavities 128 of the first and second bearing members 94, 96 can be omitted. In yet another embodiment, the first and second bearing members 94, 96 can include first and second end portions 121, 122 that both include a seal cavity. In such an embodiment, the seal cavities 168 in the first and second collars 98, 100 can be omitted.

In other embodiments, a pin cartridge assembly according to principles of the present disclosure can include other components and have different arrangements. For example, in other embodiments the pin cartridge assembly can include sleeve bearings and other components as shown and described in U.S. Patent Application Publication No. 2006/0284485, which is incorporated in its entirety herein by this reference.

Figure 5:
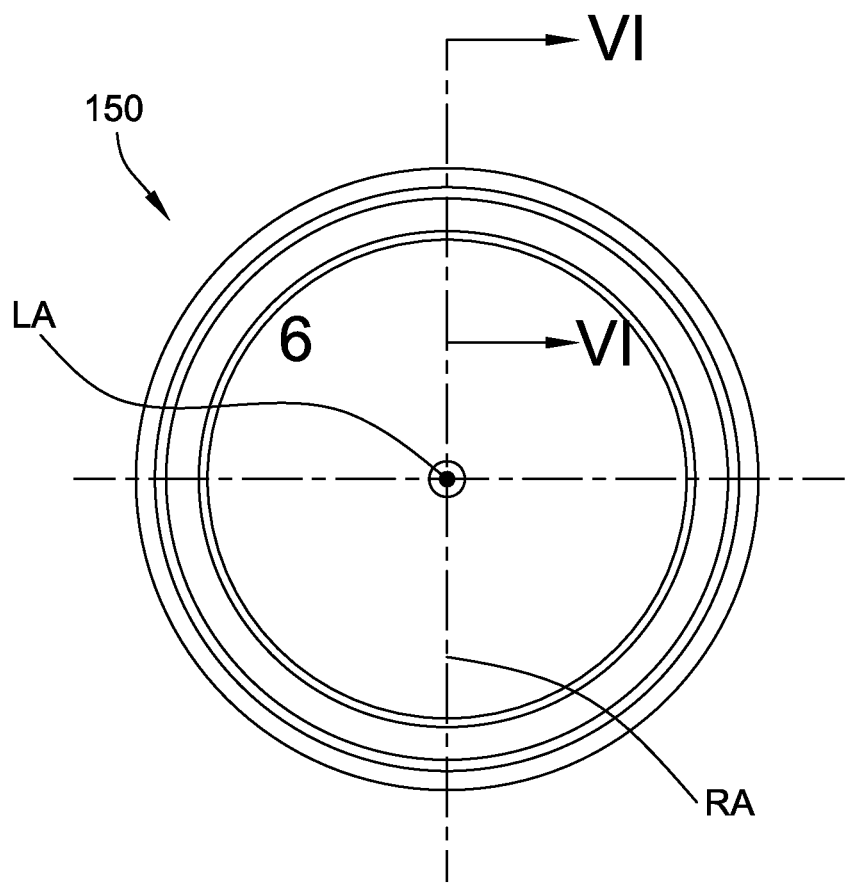
FIG. 5 is an end elevational view of an embodiment of a seal assembly constructed in accordance with principles of the present disclosure.

In yet other embodiments of a track chain assembly, the track chain assembly can include a plurality of subassemblies each including a cartridge assembly, an inner offset link, an outer offset link, and a track shoe connected to the inner and outer offset links. An inner offset master link and an outer offset master link can be is used to connect opposite ends of the track chain assembly to form a closed loop. The inner and outer offset links and the inner and outer offset master links, can be offset links each being a mirror image of the other and can be substantially similar to the inner and outer links 16', 18' and the inner and outer master links 22', 24' described in U.S. Pat. No. 6,739,680, which is incorporated in its entirety herein by this reference, and as shown in FIGS. 4 and 5 thereof. In yet other embodiments, the track chain assembly can have other track configurations, such as those having S-shaped links or multi-piece links.

Figure 6:
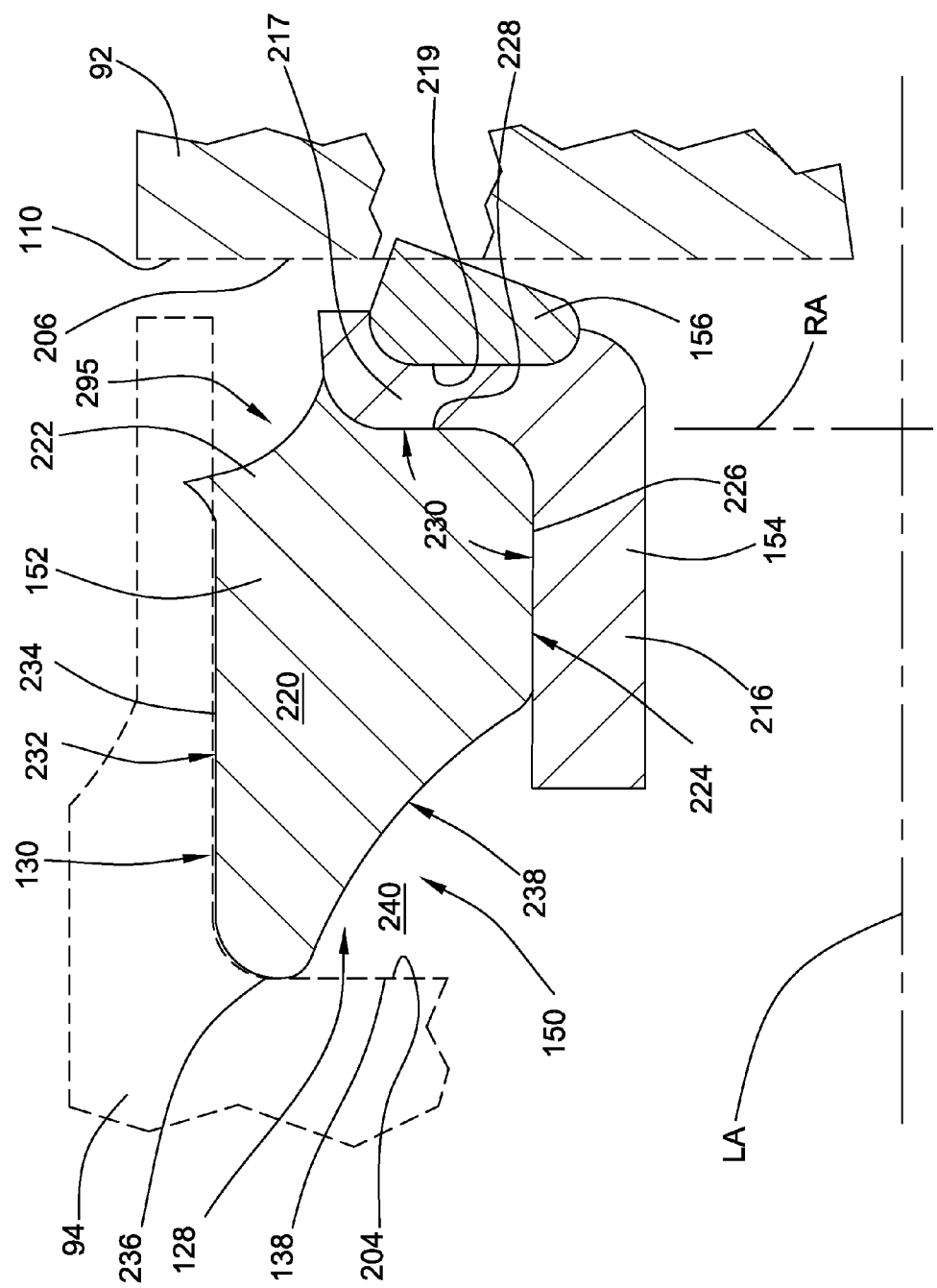
FIG. 6 is a cross-sectional view taken along line VI-VI in FIG. 5 of the seal assembly of FIG. 5, the seal assembly shown in an uninstalled state in comparison to surfaces of a seal cavity of a first member and a sealing surface of a second member shown in phantom lines.

Referring to FIGS. 5 and 6, the first seal assembly 150, which is constructed in accordance with principles of the present disclosure, is shown in an uninstalled state wherein the components are not compressed. Referring to FIG. 5, the components of the first seal assembly 150 are in the shape of an annular ring. Referring to FIG. 6, the cross-sectional shapes of the components of the first seal assembly 150 through a plane intersecting the center of the seal assembly 150 are shown. It should be understood that the illustrated components have a substantially similar configuration about their entire circumference such that a cross-sectional view taken through another plane intersecting the center of the seal assembly 150 would be substantially similar.

Referring to FIG. 6, the first seal assembly 150 includes the load ring 152, the can or seal ring 154, and the sealing lip 156 extending axially from the seal ring 154. Inasmuch as the second seal assembly 190 is identical to the first seal assembly 150, it will be understood that the description of the first seal assembly 150 is also applicable to the second seal assembly 190.

The first seal assembly 150 is adapted for use in sealing a joint having a first member pivotable about a rotational axis relative to a second member, such as, the first bearing member 94 being pivotable relative to the bushing 92 about a rotational axis that coincides with the longitudinal axis "LA" of the track pin 90, for example. The first member in the form of the first bearing member 94 and the second member in the form of the bushing 92 are both coaxial with the track pin 90 about the longitudinal axis "LA." The first member in the form of the first bearing member 94 includes the load ring engagement surface 130 and a base surface 204 of the radial base segment 138 defining, at least in part, the axially-extending seal cavity 128 about the rotational axis "LA" which is disposed in proximal relationship to the second member in the form of the bushing 92. The first seal assembly 150 can be disposed within the seal cavity 128 to sealingly engage the first member in the form of the first bearing member 94 and the second member in the form of the bushing 92 while allowing relative rotation therebetween.

The load ring engagement surface 130 of FIG. 6 has a generally straight profile to define a cylinder with a flat radial base. In other embodiments, the load ring engagement surface 130 can have a different shape. The load ring engagement surface 130 of the first member sealingly engages the load ring 152.

An inner surface of the first member, such as the inner cylindrical axial wall segment 134 (shown in FIG. 4), also defines the seal cavity 128. In some embodiments, the inner surface can be integrally formed with the load ring engagement surface 130 and the base surface 204 or can be provided by an insert sleeve component, such as by the thrust ring 180, for example. In other embodiments, the base surface 204 can be defined by a separate thrust ring (not shown).

In other embodiments of a track pin joint assembly, other components (such as, the bushing 92, the first and second collars 98, 100, and the track links 46, 48, for example) can define suitable seal cavities. In other embodiments, other seal cavity locations within the components of the track pin joint assembly can be used.

The second member includes a sealing surface 206 in sealing engagement with the sealing lip 156 of the seal assembly 150. The sealing surface 206 is part of the first end face 110 of the bushing 92 in the example illustrated in FIG. 6.

Referring to FIG. 6, the sealing lip 156 is in the form of an annulus and extends axially from the seal ring 154 along the longitudinal axis "LA." The sealing lip 156 is adapted to sealingly engage, in a running fluid-tight seal, one of the members of the track pin joint assembly which is rotationally movable with respect to another member thereof. In the illustrated example, the sealing lip 156 is adapted to sealingly engage the sealing surface 206 of the first end face 110 of the bushing 92, which can be considered the second member of the track pin joint assembly, where the bushing 92 is rotationally movable with respect to the first member in the form of the first bearing member 94 about the longitudinal axis "LA" of the track pin 90. In other embodiments, the sealing lip 156 can have a different cross-sectional shape.

The seal ring 154 is in the form of an annulus. The seal ring 154 has an axial flange 216, extending along the rotational or longitudinal axis "LA", and a radial flange 217, extending along a radial axis "RA," which is perpendicular to the rotational axis "LA." The sealing lip 156 extends axially from the radial flange 217 of the seal ring 154 such that it is in engaging relationship with the second member in the form of the bushing 92 in the illustrated example to provide a running seal therebetween.

In some embodiments, the sealing lip 156 is separately formed and then attached to the seal ring 154. In the illustrated embodiment, the radial flange 217 defines a concave groove 219 adapted to receive the sealing lip 156 therein. In other embodiments, the seal ring 154 and the sealing lip 156 can be integrally formed as a unitary structure. The seal ring 154 can be made from a rigid material and transmit force from the load ring 152, which is mounted to the seal ring 154 and is in an installed condition in a seal cavity and under compression. The force from the load ring 152 can be transferred from the seal ring 154 to the sealing lip 156 as a sealing force against the second member.

Figure 7:
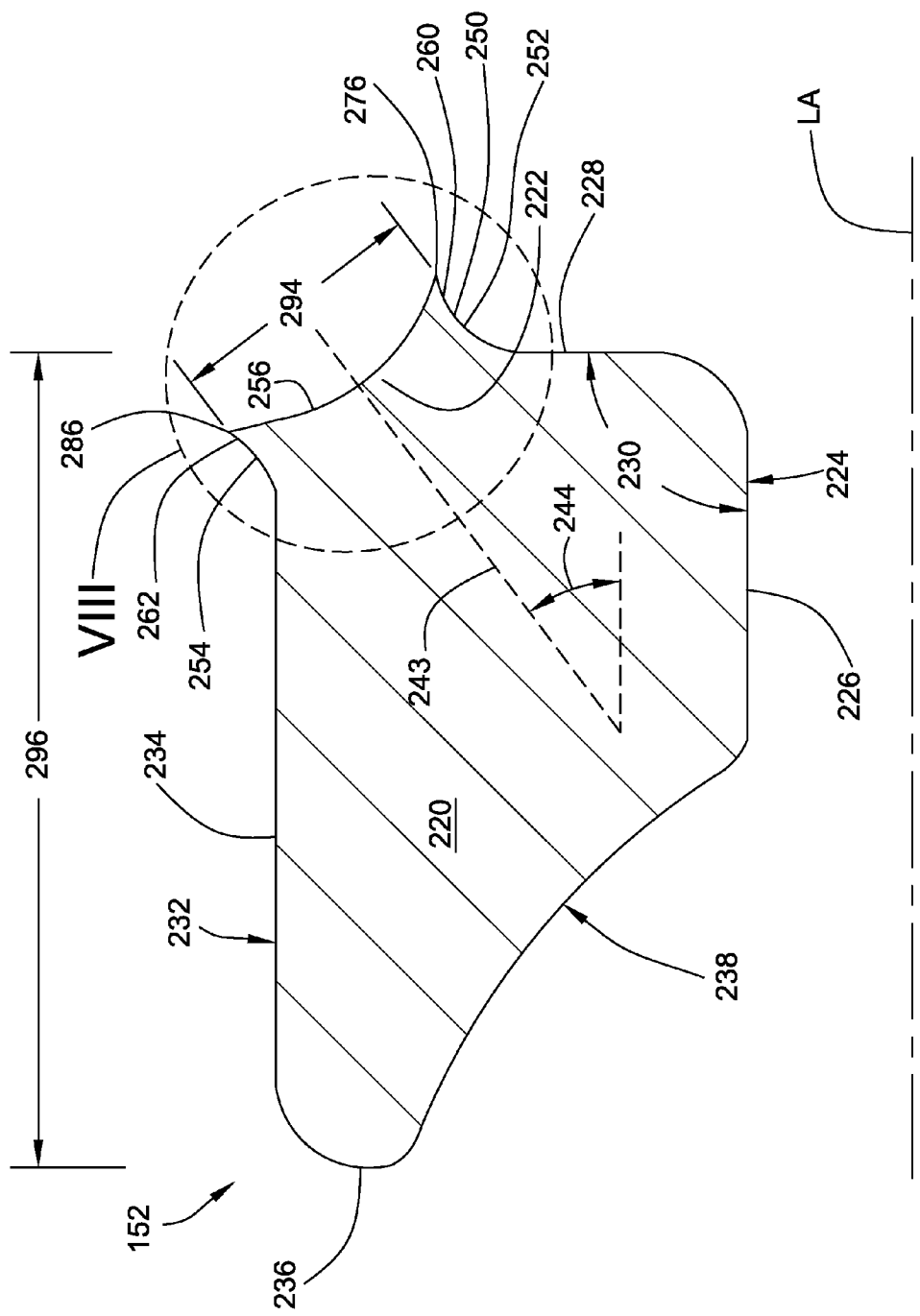
FIG. 7 is a cross-sectional view, as in FIG. 6, of a load ring of the seal assembly of FIG. 5, which is constructed in accordance with principles of the present disclosure.

Referring to FIGS. 6 and 7, the load ring 152 is in the form of an annulus. The load ring 152 includes a main body 220 and a neck 222 extending from the main body 220.

The main body 220 of the load ring 152 is annular and includes a seal ring engagement surface 224, a first member engagement surface 232, and a relief surface 238. The seal ring engagement surface 224 includes an axial segment 226 and a radial segment 228 adapted to engage the axial flange 216 and the radial flange 217 of the seal ring 154, respectively. In embodiments, the relief surface 238 can be configured to allow the load ring 152 to deform when under axial load to help prevent undergoing excessive twist which could lead to loss in contact pressure and seal failure.

Referring to FIG. 6, the axial segment 226 of the seal ring engagement surface 224 is in proximate relationship with the axial flange 216 of the seal ring 154, and the radial segment 228 is in proximate relationship with the radial flange 217 of the seal ring 154. In some embodiments, and as shown, the axial segment 226 of the seal ring engagement surface 224 may extend in substantially parallel relationship to the longitudinal axis "LA" of the track pin 90 with the radial segment 228 extending at an angle 230 to the axial segment 226. In embodiments, the angle 230 can be in a range between about twenty degrees and about one hundred sixty degrees.

As shown, the axial segment 226 and the radial segment 228 of the seal ring engagement surface 224 are disposed in substantially perpendicular relationship with respect to each other. The illustrated axial segment 226 of the seal ring engagement surface 224 is substantially cylindrical and substantially parallel to the longitudinal axis "LA" of the track pin 90. The illustrated radial segment 228 is substantially perpendicular to the longitudinal axis "LA" of the track pin 90.

The first member engagement surface 232 is disposed opposite the seal ring engagement surface 224 and includes an axial segment 234 and a radial segment 236. The first member engagement surface 232 is adapted to sealingly engage the load ring engagement surface 130 of the first member in the form of the first bearing member 94 in the illustrated example of FIG. 6.

As shown, the axial segment 234 of the first member engagement surface 232 is substantially cylindrical and substantially parallel to the longitudinal axis "LA" of the track pin 90. The illustrated axial segment 234 of the first member engagement surface 232 is substantially parallel to the axial segment 226 of the seal ring engagement surface 224.

The radial segment 236 of the first member engagement surface 232 can be shaped to engage a portion of the base surface 204 in the seal cavity 128. The radial segment 236 of the first member engagement surface 232 is in distal relationship with the radial segment 228 of the seal ring engagement surface 224. In some embodiments, and as shown, the radial segment 236 of the first member engagement surface 232 has a rounded convex shape. In other embodiments, the radial segment 236 of the first member engagement surface 232 can include a straight portion.

In embodiments, and as shown, the radial segment 236 of the first member engagement surface 232 can be in outward radial, offset relationship with the radial segment 228 of the seal ring engagement surface 224. The illustrated radial segment 236 of the first member engagement surface 232 is on outward, non-overlapping radial relationship with the illustrated radial segment 228 of the seal ring engagement surface 224.

The relief surface 238 extends between the radial segment 236 of the first member engagement surface 232 and the axial segment 226 of the seal ring engagement surface 224. The illustrated relief surface 238 is in the form of a concave curved surface when in an uninstalled condition, as shown in FIGS. 6 and 7.

The relief surface 238 can be configured to define a relief area 240 in the seal cavity 128 adjacent the base surface 204 of the first member in the form of the first bearing member 94. When the seal assembly 150 is installed in the seal cavity 128 and under compression, such as when the second member in the form of the bushing 92 moves axially along the longitudinal axis "LA" relative to the first member to further decrease the axial length of the seal cavity 128 along the longitudinal axis "LA," the load ring 152 can deform in response to the forces exerted against it. The relief area 240 can provide a space into which the load ring 152 can deform, even under conditions in which the seal cavity 128 has a decreased volume.

Referring to FIG. 7, the neck 222 is annular and extends from the main body 220. The neck 222 is disposed between the axial segment 234 of the first member engagement surface 232 and the radial segment 228 of the seal ring engagement surface 224. The neck 222 extends along a neck axis 243 disposed in oblique relationship with the axial segment 226 of the seal ring engagement surface 224. In the uninstalled, uncompressed state, the neck 222 extends from the main body 220 along the neck axis 243 at a neck angle 244, with respect to the axial segment 226 of the seal ring engagement surface 224. In embodiments, the neck angle 244 is in a range between about twenty degrees and about seventy degrees when the neck 222 is in an uncompressed, uninstalled state, and in a range between about thirty degrees and about sixty degrees in still other embodiments.

Figure 8:
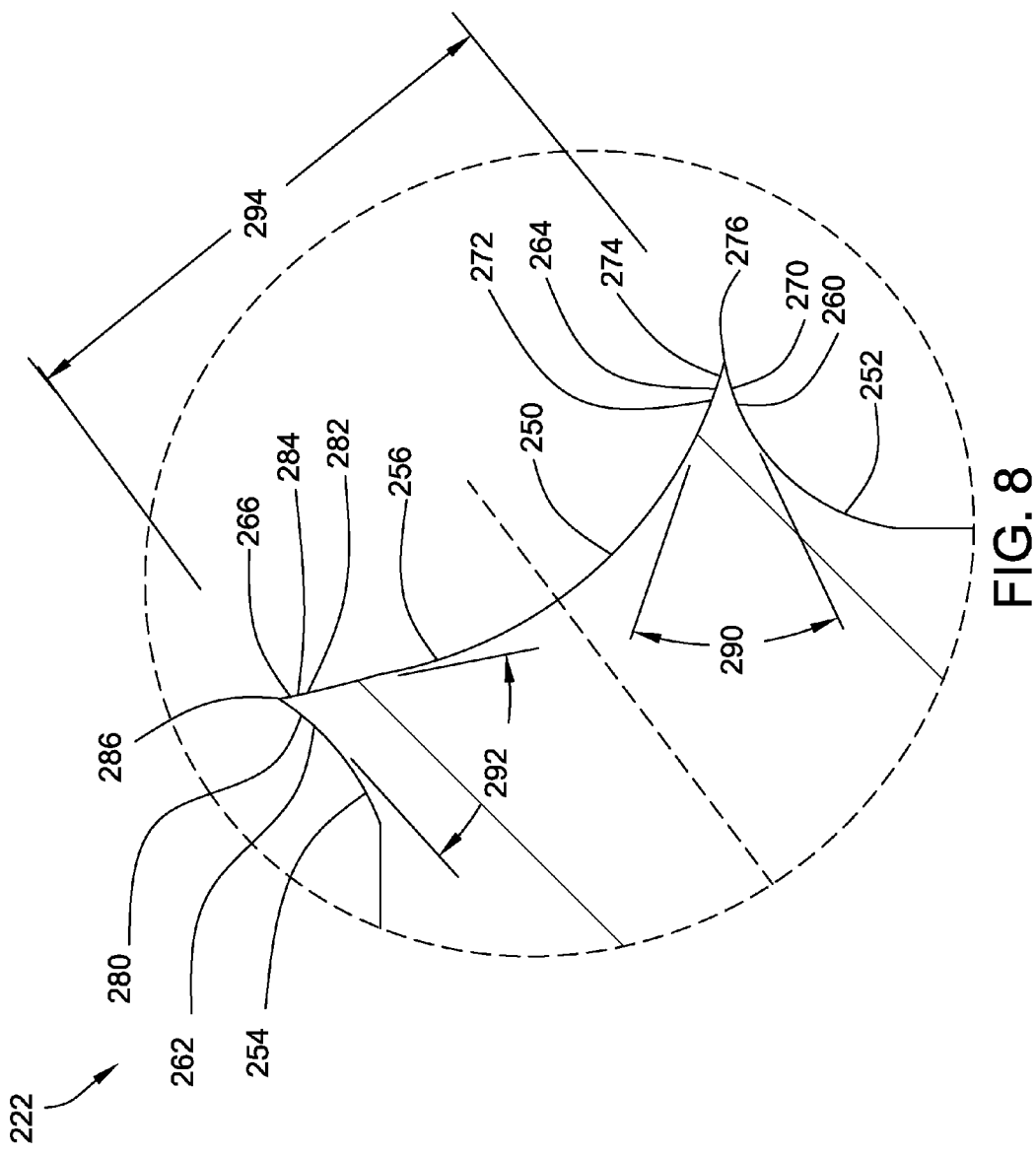
FIG. 8 is an enlarged detail view taken from FIG. 7, as indicated by circle IX in FIG. 8.

Referring to FIGS. 7 and 8, the neck 222 has a neck perimeter 250 which includes an inner lateral side 252, an outer lateral side 254, and a distal neck end 256 extending between the inner lateral side 252 and the outer lateral side 254. Each of the illustrated inner lateral side 252, the outer lateral side 254, and the distal neck end 256 is in the form of a concave curved surface when in an uninstalled condition, as shown in FIG. 7.

A first sealing blade 260 and a second sealing blade 262 are disposed along the neck perimeter 250, each comprising an outwardly-extending projection. The first sealing blade 260 is adapted to sealingly engage one of the seal ring 154 and a first member, such as the first bearing member 94 in FIGS. 6 and 9, and the second sealing blade 262 is adapted to sealingly engage the other of the seal ring 154 and the first member 94. The illustrated first sealing blade 260 is adapted to sealingly engage the seal ring 154, and the illustrated second sealing blade 262 is adapted to sealingly engage the first member, such as the first bearing member 94.

Referring to FIG. 8, the first sealing blade 260 and the second sealing blade 262 define a pair of distal neck corners 264, 266 of the neck perimeter 250. The first sealing blade 260 and the second sealing blade 262 are disposed, respectively, between the distal neck end 256 and the inner lateral side 252 and the distal neck end 256 and the outer lateral side 254.

The first sealing blade 260 includes a pair of blade faces 270, 272 disposed in converging relationship to each other to define an inclined sealing lip 274 at a distal blade end 276 of the first sealing blade 260. The illustrated first sealing blade 260 includes an inner lateral blade face 270 and an inner end blade face 272 respectively disposed adjacent the inner lateral side 252 and the distal neck end 256 of the neck perimeter 250. The second sealing blade 262 includes a pair of blade faces 280, 282 disposed in converging relationship to each other to define an inclined sealing lip 284 at a distal blade end 286 of the second sealing blade 262. The illustrated second sealing blade 262 includes an outer lateral blade face 280 and an outer end blade face 282 respectively disposed adjacent the outer lateral side 254 and the distal neck end 256 of the neck perimeter 250.

Referring to FIG. 8, the pair of blade faces 270, 272 of the first sealing blade 260 define a first blade angle 290 therebetween at the inclined sealing lip 274. The pair of blade faces 280, 282 of the second sealing blade 262 define a second blade angle 292 therebetween at the inclined sealing lip 284. The first blade angle 290 and the second blade angle 292 can be adjusted to achieve a desired contact pressure generated by the load ring against the surfaces in contacting relationship with the first and second sealing blades 260, 262 through a given range of relative axial motion (e.g., 1 mm) of the first and second members of the track pin joint. In general, it has been discovered that contact pressure increases as the blade angle increases. In embodiments, the first and second sealing blades 260, 262 can have different blade angles to achieve a combination of adequate flexibility to generate a "wiping" action against the surface in contacting relationship with the particular blade to promote a conforming, sealing contacting relationship and of adequate rigidity to generate a desired contact pressure.

In embodiments, the first blade angle 290 and the second blade angle 292 are each an acute angle. In embodiments, the first blade angle 290 and the second blade angle 292 are both in a range between about twenty-five degrees and about eighty degrees, and in a range between about thirty degrees and about seventy-five degrees in still other embodiments.

In embodiments, the first blade angle 290 can be different from the second blade angle 292. In embodiments, the second blade angle 292 is greater than the first blade angle 290. In embodiments, a ratio of the second blade angle 292 to the first blade angle 290 is in a range between about 7:5 and about 16:5, and in a range between about 3:2 and about 8:3 in still other embodiments. In embodiments, a ratio of the second blade angle 292 to the first blade angle 290 is about two.

In embodiments, the first blade angle 290 is in a range between about thirty degrees and about forty degrees, and the second blade angle 292 is in a range between about sixty degrees and about eighty degrees. In some embodiments, the first blade angle 290 is about thirty-five degrees, and the second blade angle 292 is about seventy degrees.

The neck 222 has a neck thickness 294, measured in a direction perpendicular to the neck axis 243 between the extreme lateral points of the neck 222 when the load ring 152 is in an uninstalled condition, wherein it is not compressed or otherwise deformed. In the illustrated embodiment, the distal blade ends 276, 286 of the first and second sealing blades 260, 262 comprise the extreme lateral point of the inner lateral side 252 and the outer lateral side 254, respectively. The neck thickness 294 can be sized such that when the seal assembly 150 is installed in the seal cavity 128, the neck 222 is compressed between the seal ring 154 and the load ring engagement surface 130 of the first member 94 and the neck 222 substantially occludes an opening 295 defined therebetween (see FIG. 6). In embodiments, the first and second sealing blades 260, 262 comprise laterally-extending projections from the neck perimeter 250 that include extreme lateral points of the neck 222 along an axis perpendicular to the neck axis 243 when the load ring 152 is in an uninstalled condition and that are configured to sealingly engage a pair of components of the track pin joint to sealingly occlude an opening defined between the pair of components.

Referring to FIG. 7, in some embodiments, the neck thickness 294 can be in a range from about one-eighth to about one-half a distance 296, measured along the rotational axis which coincides with the longitudinal axis "LA" in the illustrated embodiment, between the radial segment 236 of the first member engagement surface 232 and the radial segment 228 of the seal ring engagement surface 224 when in an uninstalled condition, wherein the load ring 152 is uncompressed. In other embodiments, the neck thickness 294 can be in a range from about one-quarter to about one-half the distance 296 between the radial segment 236 of the first member engagement surface 232 and the radial segment 228 of the seal ring engagement surface 224 when in an uninstalled condition. The illustrated neck thickness 294 is about one-third the distance 296 between the radial segment 236 of the first member engagement surface 232 and the radial segment 228 of the seal ring engagement surface 224 when in an uninstalled condition.

Figure 9:
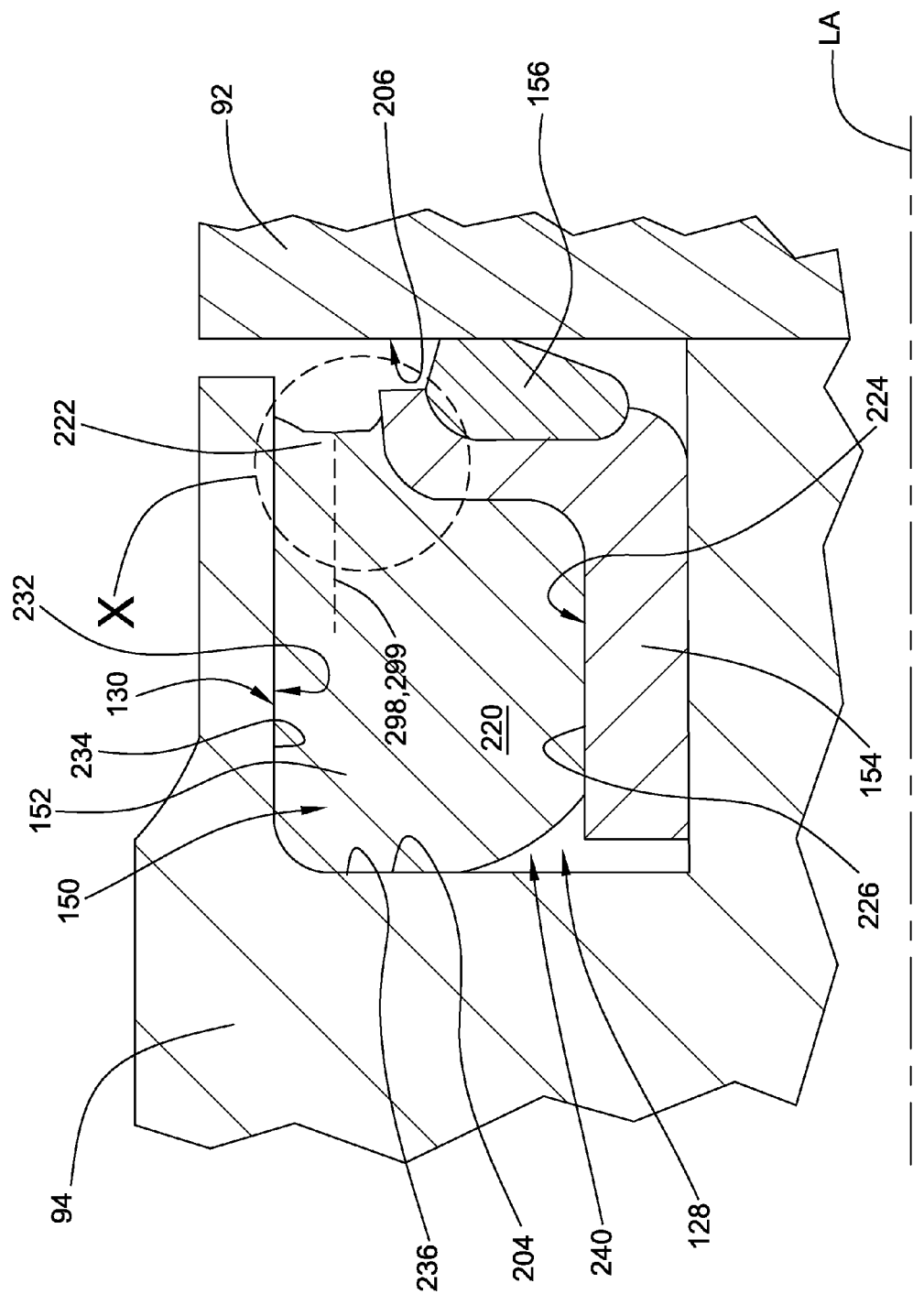
FIG. 9 is a cross-sectional view, as in FIG. 6, of the seal assembly of FIG. 5, but shown in an installed condition in the seal cavity of the first member such that the seal assembly is in sealing engagement with the first member and the second member to provide a running seal therebetween.
Figure 10:
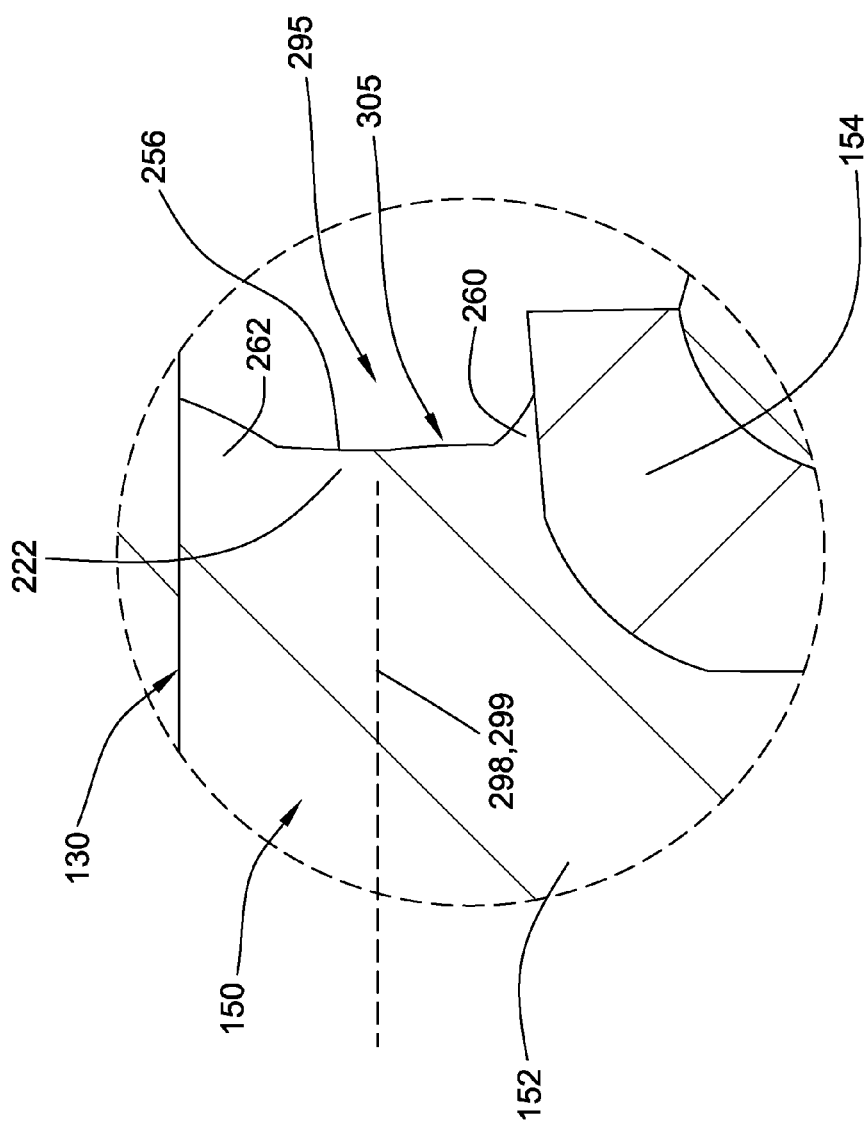
FIG. 10 is an enlarged detail view taken from FIG. 9, as indicated by circle X in FIG. 9.

Referring to FIGS. 9 and 10, the seal assembly 150 is installed in the seal cavity 128. The first member in the form of the first bearing member 94 and the second member in the form of the bushing 92 are both coaxial with the track pin 90 about the longitudinal axis "LA." The first member 94 is pivotable about the longitudinal axis "LA" with respect to the second member 92. The second member 92 includes a sealing surface 206 in sealing engagement with the sealing lip 156 of the seal assembly 150. The load ring 152 is compressed against the base surface 204 of the first member 94, which also includes the load ring engagement surface 130 that defines, at least in part, the axially-extending seal cavity 128. The seal cavity 128 is disposed in proximal relationship to the second member 92.

The load ring 152 acts as a gasket and sealingly engages the first member in the form of the first bearing member 94 and the seal ring 154. The first member engagement surface 232 of the load ring 152 engages the load ring engagement surface 130 of the first member in the form of the first bearing member 94. As shown, the load ring 152 is placed in compression and the compression of the load ring 152 provides the sealing force to the seal ring 154, which in turn, transmits the axial sealing force to the sealing lip 156, which is in sealing engagement against the sealing surface 206 of the second member in the form of the bushing 92. The load ring 152 acts in the manner of a spring to apply an axial load against the seal ring 154 along the longitudinal axis "LA" to bring the sealing lip 156 mounted to the seal ring 154 into sealing contact with the sealing surface 206 of the second member 92 such that a running fluid-tight seal is formed therebetween.

As shown in FIG. 9, the load ring 152 is compressed. The axial segment 234 of the first member engagement surface 232 conforms to the shape of load ring engagement surface 130 of the first member in the form of the first bearing member 94. The radial segment 236 of the first member engagement surface 232 conforms to shape of the base surface 204, and is no longer convex. The relief surface 238 has taken on a convex curved shape in response to the forces applied against the load ring 152. The relief surface 238 has deformed into the relief area 240. In embodiments, the relief surface 238 can be configured such that the at least a portion of the relief area 240 is unoccupied by the deformed load ring 152 throughout the entire range of relative axial travel between the first and second members of the track pin joint.

Referring to FIGS. 9 and 10, the neck 222 is deflected by the load ring engagement surface 130 of the first member in the form of the first bearing member 94 and compressed between the seal ring 154 and the load ring engagement surface 130. The neck 222 of the load ring 152 extends from the main body 220 along a second neck axis 298 disposed at a second neck angle 299 with respect to the axial segment 226 of the seal ring engagement surface 224 in an installed state, wherein the load ring 152 is compressed between the first member 94 and the seal ring 154. The first neck angle 244, shown in FIG. 7, is different from the second neck angle 299, shown in FIG. 9. In some embodiments, the difference between the first neck angle 244 and the second neck angle 299 is in a range from about three degrees to about sixty degrees. In other embodiments, the difference between the first neck angle 244 and the second neck angle 299 is in a range from about ten degrees to about fifty degrees. In still other embodiments, the difference between the first neck angle 244 and the second neck angle 299 is in a range from about thirty degrees to about forty degrees. The illustrated neck angle 299 is about zero degrees. In other words, the second neck axis 298 is substantially parallel to the axial segment 226 of the seal ring engagement surface 224 in an installed state.

Referring to FIG. 10, the first and second sealing blades 260, 262 of the neck 222 are in respective sealing engagement with the seal ring 154 and the load ring engagement surface 130 of the first member in the form of the first bearing member 94. The first and second sealing blades 260, 262 are deformed inwardly toward each other in response to the compressive engagement of the load ring 152 which is disposed between the opening 295 defined between the seal ring 154 and the load ring engagement surface 130 of the first member in the form of the first bearing member 94. The neck 222 substantially occludes the opening between the seal ring 154 and the load ring engagement surface 130 of the first member in the form of the first bearing member 94 to thereby substantially block the dirt ingestion paths along the load ring engagement surface 130 and the seal ring 154 into the seal cavity 128. The distal neck end 256 defines a concave recess 305 which can help allow any debris entering this area to collect in the concave recess 305, rather than driving past the first and second sealing blades 260, 262 into the seal cavity 128.

Figure 11:
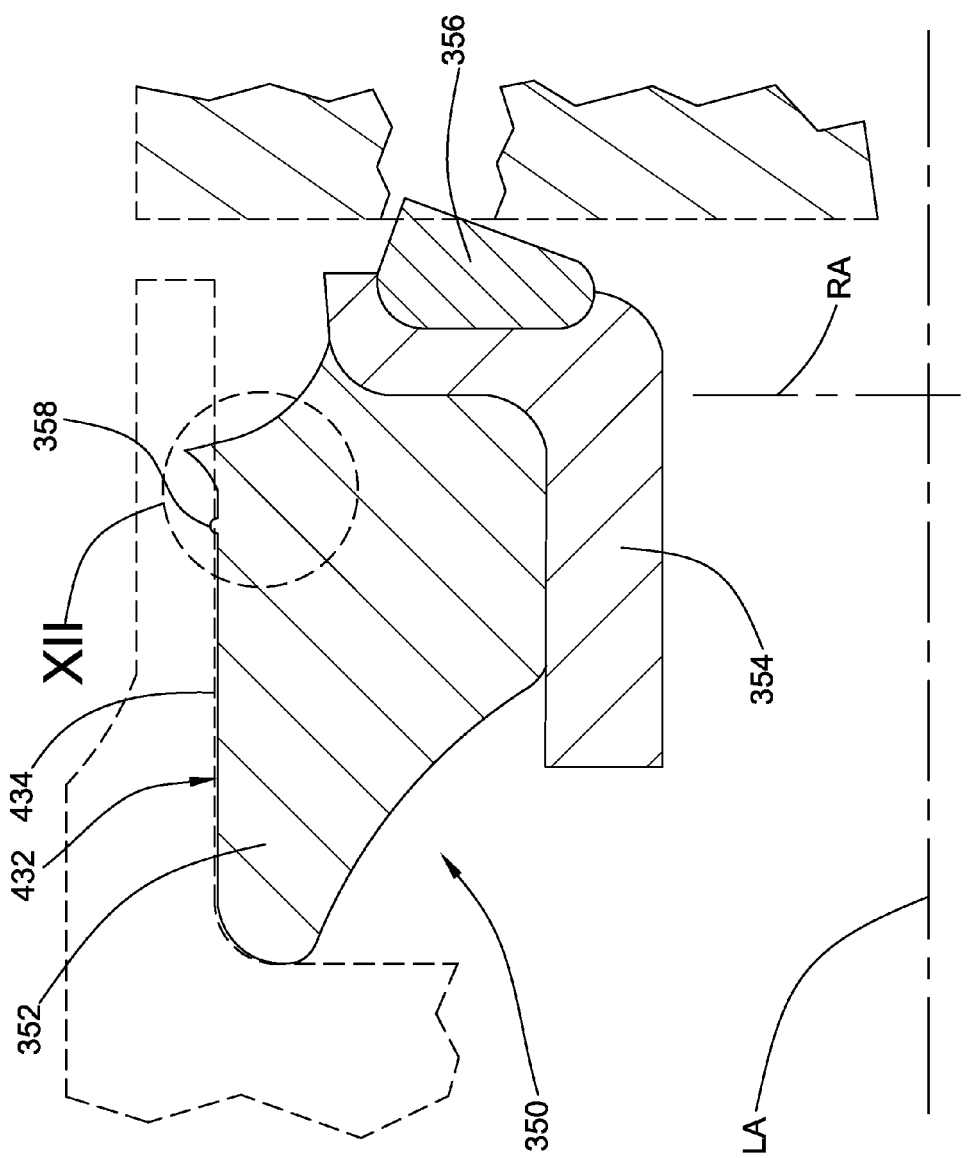
FIG. 11 is a cross-sectional view elevational view, as in FIG. 6, of another embodiment of a seal assembly constructed in accordance with principles of the present disclosure shown in an uninstalled state in comparison to surfaces of a seal cavity of a first member and a sealing surface of a second member shown in phantom lines.
Figure 12:
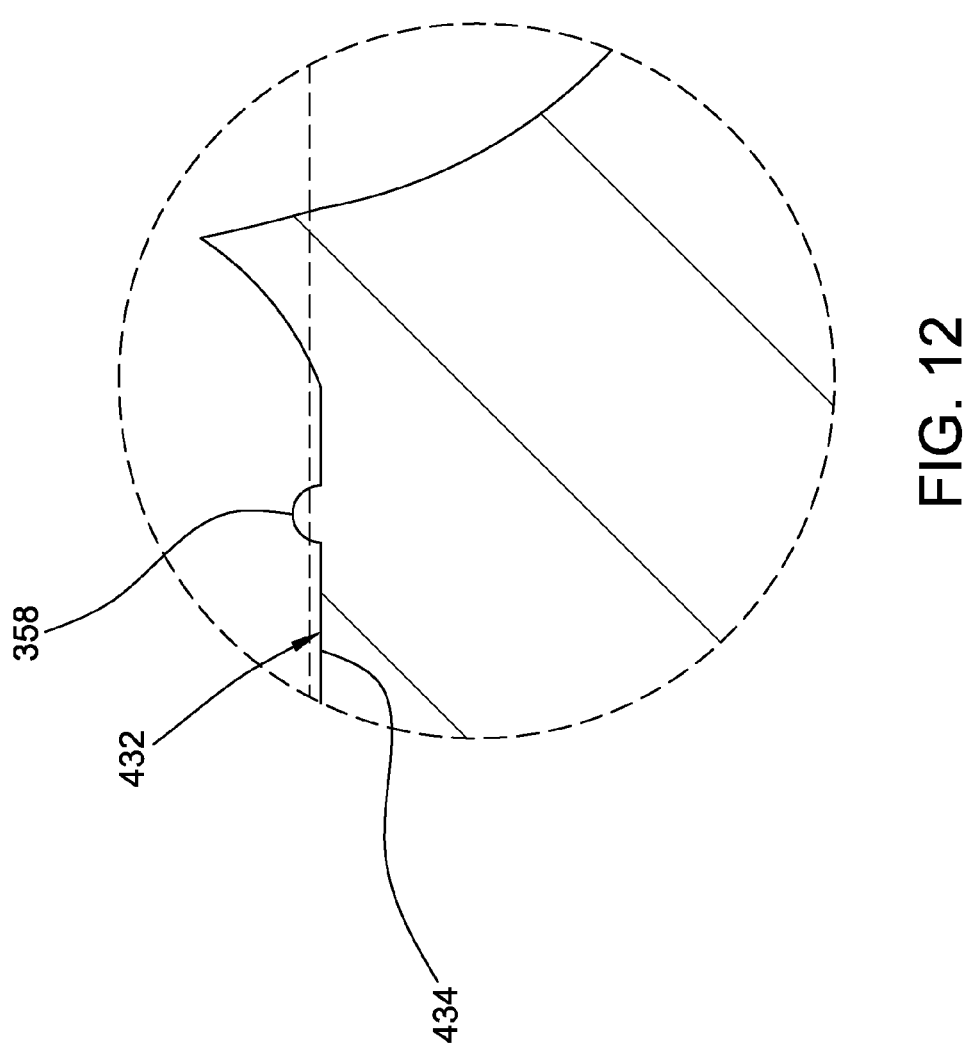
FIG. 12 is an enlarged detail view taken from FIG. 11, as indicated by circle XII in FIG. 11.

Referring to FIGS. 11 and 12, another embodiment of a seal assembly 350 constructed in accordance with principles of the present disclosure is shown. The seal assembly 350 includes a load ring 352, a can or seal ring 354, and a seal member in the form of a sealing lip 356.

The load ring 352 includes a protrusion or bump 358 extending radially outwardly from an axial segment 434 of a first member engagement surface 432. The bump 358 can be configured to increase the sealing pressure generated by the load ring 352 when in a compressed state. The increased sealing pressure can help increase the sealing engagement generated by the seal assembly 350 and help reduce the ingestion of contaminants into the seal cavity protected by the seal assembly 350.

In embodiments, the bump 358 can be formed at a parting line of a pair of molds used to manufacture the load ring 352. In embodiments, the axial location of the bump 358 along the longitudinal axis "LA" can be varied. The seal assembly 350 of FIG. 11 can be similar in other respects to the seal assembly 150 of FIG. 6.

Figure 13:
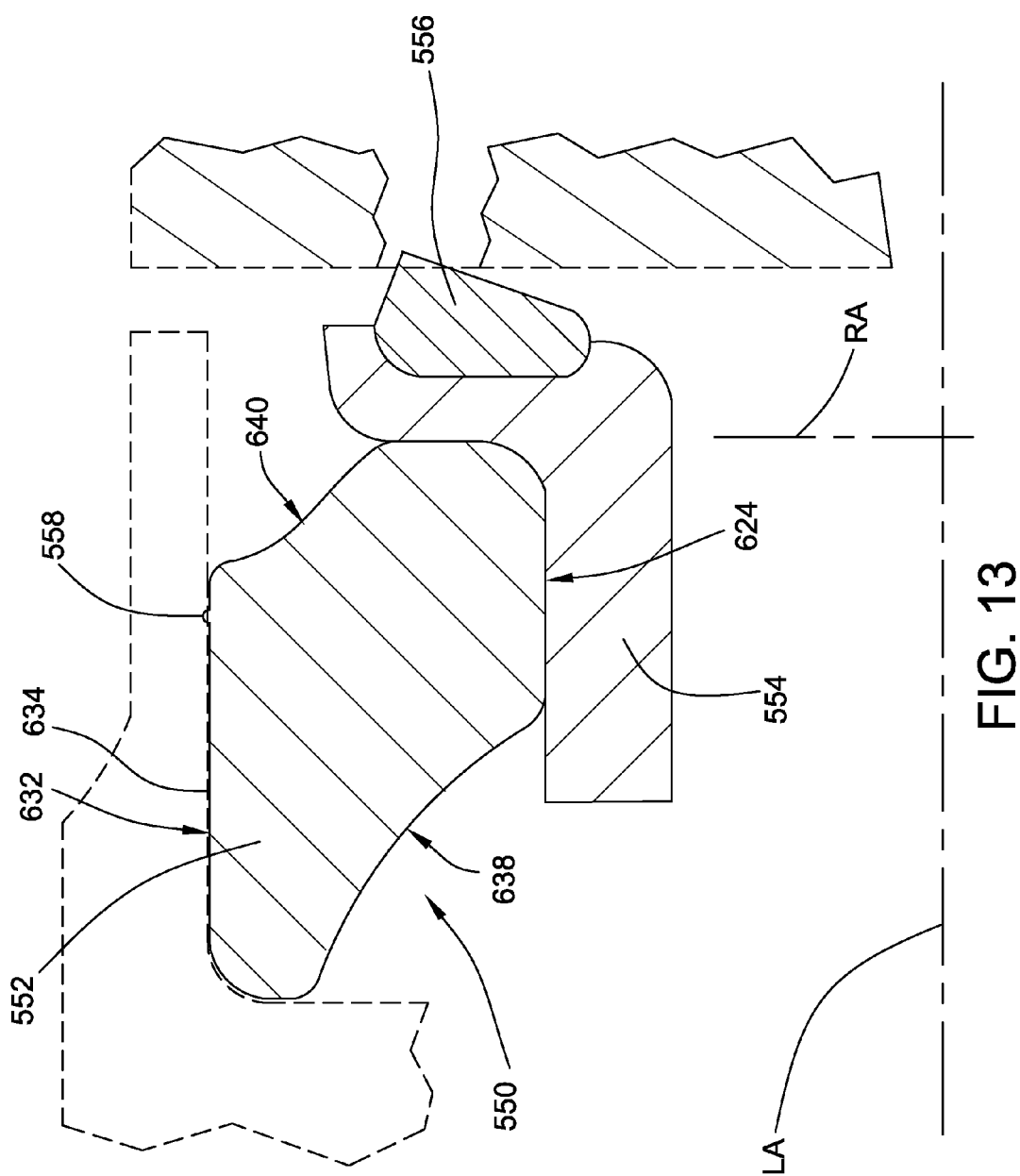
FIG. 13 is a cross-sectional view, as in FIG. 6, of another embodiment of a seal assembly constructed in accordance with principles of the present disclosure shown in an uninstalled state in comparison to surfaces of a seal cavity of a first member and a sealing surface of a second member shown in phantom lines.

Referring to FIG. 13, another embodiment of a seal assembly 550 constructed in accordance with principles of the present disclosure is shown. The seal assembly 550 includes a load ring 552, a can or seal ring 554, and a seal member in the form of a sealing lip 556. The load ring 552 includes a seal ring engagement surface 624, a first member engagement surface 632, an inner relief surface 638, and an outer relief surface 640.

The load ring 552 includes a protrusion or bump 558 extending radially outwardly from an axial segment 634 of the first member engagement surface 632. The bump 558 can be configured to increase the sealing pressure generated by the load ring 552 when in a compressed state. The increased sealing pressure can help increase the sealing engagement generated by the seal assembly 550 and help reduce the ingestion of contaminants into the seal cavity protected by the seal assembly 550. The seal assembly 550 of FIG. 13 can be similar in other respects to the seal assemblies 150, 350 of FIGS. 6 and 11.

INDUSTRIAL APPLICABILITY

The industrial applicability of the embodiments of a track pin joint and a track seal assembly described herein will be readily appreciated from the foregoing discussion. At least one embodiment of the disclosed seal assemblies may be used for a track pin joint assembly. At least one embodiment of the disclosed track pin joint assemblies can be used in an undercarriage of a track-type machine.

An exemplary embodiment discloses a seal assembly for sealing between a first member and a second member of a joint, the first member being able to pivot about an axis of the joint relative to the second member. The first member and the second member may be parts of two links of a track joint.

In general, a seal assembly has been disclosed that can help resist the ingestion of mud and debris and thus help inhibit the occurrence of heel under failures of a can seal. During use, the load ring of a seal assembly of a track pin joint according to principles of the present disclosure may provide one or more of the following benefits. First, the deflected and compressed neck of the load ring may provide a high sealing force between the neck and the load ring engagement surface of the member of the track pin joint to resist the ingestion of mud, dirt, debris, and water between the load ring and the member. Further, the configuration of the neck of the load ring can substantially occlude an opening between the seal ring and one of the members being sealed. First and second sealing blades of the neck can be configured to sealingly engage respective components to help substantially block the dirt ingestion path. A load ring having such a neck may be applied to known track pin joint components to help inhibit the ingestion of mud and debris between the load ring and the seal cavity.

Embodiments of a seal assembly and a track pin joint assembly according to principles of the present disclosure may find potential application in any machine, such as a track-type tractor, which utilizes a track-type undercarriage. Yet further, the present disclosure may be applicable to track assemblies in which the components are subject to significant wear. Such machines may include, but are not limited to, dozers, loaders, excavators, or any other on-highway or off-highway vehicles or stationary machines that utilize a track assembly, as described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A load ring for a seal assembly configured to seal a joint having a first member pivotable about a rotational axis relative to a second member thereof, the seal assembly including a seal ring having an axial flange extending along the rotational axis and a radial flange extending along a radial axis perpendicular to the rotational axis, the first member including a load ring engagement surface defining, at least in part, an axially-extending seal cavity about the rotational axis, the load ring comprising:

a main body, the main body being annular and including a seal ring engagement surface and a first member engagement surface:

the seal ring engagement surface including an axial segment and a radial segment adapted to engage the axial flange and the radial flange of the seal ring, respectively, and the first member engagement surface adapted to engage the load ring engagement surface of the first member, the first member engagement surface including an axial segment and a radial segment, the radial segment of the first member engagement surface being in distal relationship with the radial segment of the seal ring engagement surface; and a neck, the neck extending from the main body and disposed between the axial segment of the first member engagement surface and the radial segment of the seal ring engagement surface, the neck having a neck perimeter with a first sealing blade disposed along the neck perimeter and comprising an outwardly-extending projection, the first sealing blade adapted to sealingly engage one of the seal ring and the first member.

2. The load ring of claim 1, wherein the axial segment of the seal ring engagement surface and the axial segment of the first member engagement surface are substantially parallel to each other.

3. The load ring of claim 1, further comprising:
a relief surface extending between the radial segment of the first member engagement surface and the axial segment of the seal ring engagement surface.

4. The load ring of claim 1, wherein the neck perimeter includes an inner lateral side, an outer lateral side, and a distal neck end extending between the inner lateral side and the outer lateral side, and the distal neck end is concave.

5. The load ring of claim 1, wherein the neck extends along a neck axis, the neck axis being disposed in oblique relationship with the axial segment of the seal ring engagement surface.

6. The load ring of claim 5, wherein the neck axis is disposed at a neck angle, with respect to the axial segment of the seal ring engagement surface, in a range between about twenty degrees and about seventy degrees.

7. The load ring of claim 1, wherein the first sealing blade includes a pair of blade faces disposed in converging relationship to each other to define an inclined sealing lip at a distal blade end of the first sealing blade, the pair of blade faces defining a first blade angle therebetween at the inclined sealing lip, the first blade angle being an acute angle.

8. The load ring of claim 7, wherein the first blade angle is in a range between about twenty-five degrees and about eighty degrees.

9. The load ring of claim 7, wherein the first blade angle is in a range between about thirty degrees and about seventy-five degrees.

10. The load ring of claim 1, wherein the first sealing blade is adapted to sealingly engage the seal ring, and the neck includes a second sealing blade disposed along the neck perimeter and comprising a second outwardly-extending projection, the second sealing blade adapted to sealingly engage the first member.

11. The load ring of claim 10, wherein the neck perimeter includes an inner lateral side, an outer lateral side, and a distal neck end extending between the inner lateral side and the outer lateral side, the distal neck end is concave, and the first sealing blade and the second sealing blade define a pair of distal neck corners disposed, respectively, between the distal neck end and the inner lateral side and the distal neck end and the outer lateral side.

12. The load ring of claim 11, wherein the first sealing blade and the second sealing blade each includes a pair of blade faces disposed in converging relationship to each other to define an inclined sealing lip at a distal blade end of the first sealing blade and the second sealing blade, respectively, the pair of blade faces of the first sealing blade and the second sealing blade respectively defining a first blade angle and a second blade angle therebetween at the inclined sealing lip, the first blade angle and the second blade angle each being an acute angle.

13. The load ring of claim 12, wherein the second blade angle is greater than the first blade angle.

14. The load ring of claim 12, wherein a ratio of the second blade angle to the first blade angle is in a range between about 7:5 and about 16:5.

15. The load ring of claim 12, wherein a ratio of the second blade angle to the first blade angle is in a range between about 3:2 and about 8:3.

16. The load ring of claim 12, wherein the first blade angle is in a range between about thirty degrees and about forty degrees, and the second blade angle is in a range between about sixty degrees and about eighty degrees.

17. A seal assembly adapted for use in sealing a joint having a first member pivotable about a rotational axis relative to a second member thereof, the first member including a load ring engagement surface defining, at least in part, an axially-extending seal cavity about the rotational axis, the seal assembly comprising:
a seal ring, the seal ring having an axial flange extending along the rotational axis and a radial flange extending along a radial axis perpendicular to the rotational axis; and
a load ring, the load ring including a main body and a neck, the main body being annular and including a seal ring engagement surface and a first member engagement surface, the seal ring engagement surface including an axial segment and a radial segment in engaging relationship with the axial flange and the radial flange of the seal ring, respectively, and the first member engagement surface adapted to engage the load ring engagement surface of the first member, the first member engagement surface including an axial segment and a radial segment, the radial segment of the first member engagement surface being in distal relationship with the radial segment of the seal ring engagement surface, and the neck extending from the main body and disposed between the axial segment of the first member engagement surface and the radial segment of the seal ring engagement surface, the neck having a neck perimeter with a first sealing blade disposed along the neck perimeter and comprising an outwardly-extending projection, the first sealing blade adapted to sealingly engage one of the seal ring and the first member.

18. The seal assembly of claim 17, wherein the neck perimeter includes an inner lateral side, an outer lateral side, and a distal neck end extending between the inner lateral side and the outer lateral side, and the distal neck end is concave, the first sealing blade is adapted to sealingly engage the seal ring, and the neck includes a second sealing blade disposed along the neck perimeter and comprising a second outwardly-extending projection, the second sealing blade adapted to sealingly engage the first member, the first sealing blade and the second sealing blade define a pair of distal neck corners disposed, respectively, between the distal neck end and the inner lateral side and the distal neck end and the outer lateral side, the first sealing blade and the second sealing blade each includes a pair of blade faces disposed in converging relationship to each other to define an inclined sealing lip at a distal blade end of the first sealing blade and the second sealing blade, respectively, the pair of blade faces of the first sealing blade and the second sealing blade respectively defining a first blade angle and a second blade angle therebetween at the inclined sealing lip, the first blade angle and the second blade angle each being an acute angle.

19. The seal assembly of claim 17, further comprising:
a sealing lip, the sealing lip extending axially from the radial flange of the seal ring and adapted to sealingly engage the second member.

20. A track pin joint assembly comprising:
a pin defining a longitudinal axis;
a first member and a second member both coaxial with the pin about the longitudinal axis, the first member being pivotable about the longitudinal axis with respect to the second member, the first member including an end and a load ring engagement surface defining, at least in part, a seal cavity disposed in proximal relationship to the second member; and
a seal assembly, the seal assembly disposed in the seal cavity and sealingly engaging the first member and the second member, the seal assembly comprising:
a seal ring, the seal ring having an axial flange extending along the longitudinal axis and a radial flange extending along a radial axis perpendicular to the longitudinal axis,
a sealing lip, the sealing lip extending axially from the radial flange of the seal ring and in engaging relationship with the second member to provide a running seal therebetween, and
a load ring, the load ring including a main body and a neck, the main body being annular and including a seal ring engagement surface and a first member engagement surface, the seal ring engagement surface including an axial segment and a radial segment in engaging relationship with the axial flange and the radial flange of the seal ring, respectively, and the first member engagement surface in engaging relationship with the load ring engagement surface of the first member, the first member engagement surface including an axial segment and a radial segment, the radial segment of the first member engagement surface being in distal relationship with the radial segment of the seal ring engagement surface, and the neck extending from the main body and disposed between the axial segment of the first member engagement surface and the radial segment of the seal ring engagement surface, the neck having a neck perimeter with a first sealing blade disposed along the neck perimeter and comprising an outwardly-extending projection, the first sealing blade adapted to sealingly engage one of the seal ring and the first member.

* * * * *